United States Patent
Kitagawa et al.

(10) Patent No.: US 10,892,485 B2
(45) Date of Patent: Jan. 12, 2021

(54) ELECTRODE MATERIAL FOR LITHIUM ION SECONDARY BATTERY, ELECTRODE MATERIAL GRANULATED BODY FOR LITHIUM ION SECONDARY BATTERY, ELECTRODE FOR LITHIUM ION SECONDARY BATTERY, AND LITHIUM ION SECONDARY BATTERY

(71) Applicant: SUMITOMO OSAKA CEMENT CO., LTD., Tokyo (JP)

(72) Inventors: Takao Kitagawa, Tokyo (JP); Tetsuya Nakabeppu, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 96 days.

(21) Appl. No.: 16/139,855

(22) Filed: Sep. 24, 2018

(65) Prior Publication Data

US 2019/0305307 A1    Oct. 3, 2019

(30) Foreign Application Priority Data

Mar. 30, 2018 (JP) ................. 2018-066577

(51) Int. Cl.

| | |
|---|---|
| *H01M 4/525* | (2010.01) |
| *C01D 15/00* | (2006.01) |
| *H01M 4/36* | (2006.01) |
| *H01M 4/62* | (2006.01) |
| *H01M 4/505* | (2010.01) |
| *H01M 10/0525* | (2010.01) |
| *H01M 10/0564* | (2010.01) |
| *B82Y 30/00* | (2011.01) |

(52) U.S. Cl.
CPC ............ *H01M 4/525* (2013.01); *C01D 15/00* (2013.01); *H01M 4/366* (2013.01); *H01M 4/505* (2013.01); *H01M 4/621* (2013.01); *H01M 4/625* (2013.01); *H01M 10/0525* (2013.01); *H01M 10/0564* (2013.01); *B82Y 30/00* (2013.01); *C01P 2004/64* (2013.01)

(58) Field of Classification Search
CPC .............................. H01M 4/625; H01M 4/663
See application file for complete search history.

(56) References Cited

U.S. PATENT DOCUMENTS

| | | | | |
|---|---|---|---|---|
| 2013/0295463 | A1* | 11/2013 | Matsuda | ............ H01M 4/0471 |
| | | | | 429/231.8 |
| 2016/0172664 | A1* | 6/2016 | Mine | ................... H01M 4/5825 |
| | | | | 429/231.8 |
| 2019/0386290 | A1* | 12/2019 | Oono | ................... H01M 4/366 |

FOREIGN PATENT DOCUMENTS

| | | |
|---|---|---|
| JP | 2001-015111 A | 1/2001 |
| JP | 2012-133888 A | 7/2012 |

* cited by examiner

*Primary Examiner* — Matthew J Merkling
(74) *Attorney, Agent, or Firm* — Merchant & Gould P.C.

(57) ABSTRACT

An electrode material for a lithium ion secondary battery of the present invention is an electrode material for a lithium ion secondary battery including an electrode active material and a carbonaceous film that coats a surface of the electrode active material, in which a hydroxy group and a group which is at least one selected from a carboxyl group, a nitro group, and a sulfo group have been introduced to an outermost surface of the carbonaceous film, a ratio of a total count number of the group which is at least one selected from the carboxyl group, the nitro group, and the sulfo group to a count number of the hydroxy group is 0.001 or more and 10.000 or less when a surface of the carbonaceous film is analyzed through time-of-flight secondary ion mass spectrometry to obtain the ratio, a coating ratio of the carbonaceous film is set to 40% or more and 90% or less, and the carbonaceous film has at least one through-hole per 100 square nanometers.

11 Claims, No Drawings

ELECTRODE MATERIAL FOR LITHIUM ION SECONDARY BATTERY, ELECTRODE
MATERIAL GRANULATED BODY FOR
LITHIUM ION SECONDARY BATTERY,
ELECTRODE FOR LITHIUM ION
SECONDARY BATTERY, AND LITHIUM ION
SECONDARY BATTERY

CROSS-REFERENCE TO RELATED APPLICATIONS

This application claims the benefit of Japanese Patent Application No. 2018-066577, filed Mar. 30, 2018, the disclosure of which is herein incorporated by reference in its entirety.

TECHNICAL FIELD

The present invention relates to an electrode material for a lithium ion secondary battery, an electrode material granulated body for a lithium ion secondary battery, an electrode for a lithium ion secondary battery, and a lithium ion secondary battery.

BACKGROUND

In recent years, as batteries from which size reduction, weight reduction, a capacity increase, and a power increase are anticipated, non-aqueous electrolyte-based secondary batteries such as a lithium ion secondary battery have been proposed and put into practical use.

A lithium ion secondary battery includes a cathode and an anode which have properties capable of reversibly intercalating and deintercalating lithium ions and a non-aqueous electrolyte.

Regarding an anode material for a lithium ion secondary battery, as an anode active material, generally, a carbon-based material or a Li-containing metal oxide having properties capable of reversibly intercalating and deintercalating lithium ions such as lithium titanate ($Li_4Ti_5O_{12}$) is used.

Regarding a cathode material for a lithium ion secondary battery, as a cathode active material, a Li-containing metal oxide having properties capable of reversibly intercalating and deintercalating lithium ions such as lamellar oxide-based lithium cobalt oxide (LCO), a ternary lamellar oxide (NCM) obtained by substituting some of cobalt with manganese and nickel, spinel lithium manganese (LMO) that is a lithium manganese oxide compound, lithium iron phosphate (LFP), or lithium iron manganese phosphate (LFMP) or an electrode material mixture including a binder or the like is used. In addition, a cathode of a lithium ion secondary battery is formed by applying the electrode material mixture onto a surface of a metal foil called an electrode current collector.

The above-described lithium ion secondary battery has a smaller size and a higher energy and weighs less than a secondary battery of the related art such as a lead battery, a nickel cadmium battery, or a nickel hydrogen battery. Therefore, the lithium ion secondary battery is used not only as a small-sized power supply used in a portable electronic device such as a mobile phone or a notebook personal computer but also as a large-sized stationary emergency power supply. In addition, recently, the lithium ion secondary battery also has been being studied as a high-output power supply for a rechargeable battery for power storage, an automatic two-wheel vehicle, an electric vehicle, a plug-in hybrid vehicle, a hybrid vehicle, an idling stop system, or an electric tool. For a lithium ion secondary battery that is used as a high-output power supply therefor, high-speed charge and discharge characteristics are demanded.

However, an electrode active material, for example, an electrode material including a lithium phosphate compound which has properties capable of reversibly intercalating and deintercalating lithium ions has a problem of a low electron conductivity. Therefore, in order to increase the electron conductivity of the electrode material, an electrode material in which surfaces of particles of an electrode active material are covered with an organic component that is a carbon source, then, the organic component is carbonized to form a carbonaceous film on the surfaces of the particles of the electrode active material, and carbon in this carbonaceous film is interposed as an electron conductive substance is known (for example, refer to Patent Document 1).

In addition, the electron conductivity of the electrode material is preferably higher. When a thickness of the carbonaceous film that coats a surface of the electrode active material becomes uneven, a place with a low electron conductivity is locally generated in a cathode. Therefore, in a case in which a lithium ion secondary battery is used as a large-sized stationary emergency power supply, particularly, used at a low temperature, in the lithium ion secondary battery, a problem of a decrease in a capacity caused by voltage drop at a final stage of discharging is caused. Therefore, in the related art, an electrode material intended to reduce unevenness in the thickness of the carbonaceous film that coats the surface of the electrode active material is known. That is, an electrode material in which unevenness in the thickness of the carbonaceous film that coats the surface of the electrode active material is alleviated by controlling a volume density of an agglomerate formed by agglomerating the electrode material (electrode material agglomerated particles) and low-temperature characteristics are improved is known (for example, refer to Patent Document 2).

Meanwhile, generally, the carbonaceous film that coats the surface of the electrode active material has an effect of imparting a conductive property to the electrode active material and an effect of decreasing a contact frequency between hydrogen fluoride generated by a reaction between a fluorine-based electrolyte in the electrolyte of the lithium ion secondary battery and moisture intruding into the electrolyte and the electrode active material. When the contact frequency between hydrogen fluoride and the electrode active material is decreased, it is possible to improve the battery service life of the lithium ion secondary battery by suppressing the dissolution of the electrode active material by hydrogen fluoride.

In addition, as a film thickness of the carbonaceous film that coats the surface of the electrode active material increases, the contact frequency between hydrogen fluoride and the electrode active material decreases, and the battery service life improves.

RELATED ART DOCUMENT

Patent Document

Patent Document 1: Japanese Laid-open Patent Publication No. 2001-015111
Patent Document 2: Japanese Laid-open Patent Publication No. 2012-133888

DISCLOSURE OF THE INVENTION

Problem that the Invention is to Solve

However, when the film thickness of the carbonaceous film that coats the surface of the electrode active material is too thick, lithium ions that are generally known as a charge migration resistance are intercalated into and deintercalated from the surface of the electrode active material, and the lithium ions diffuse in the carbonaceous film. Therefore, a resistance to a reaction of trading lithium ions between the electrolyte and the electrode active material increases. Meanwhile, when the film thickness of the carbonaceous film that coats the surface of the electrode active material is too thin, the charge migration resistance decreases, the electron conduction of the electrode material becomes insufficient, and there is a problem in that the electron conduction becomes a rate-limiting factor of a battery reaction. In addition, there is another problem in that an increase in the contact frequency between hydrogen fluoride and the electrode active material impairs the battery service life.

The present invention has been made in consideration of the above-described circumstances, and an object of the present invention is to provide an electrode material for a lithium ion secondary battery which has a high electron conductivity and an excellent diffusivity of lithium ions and enables improvement of a battery service life, an electrode material granulated body for a lithium ion secondary battery formed by agglomerating and granulating a plurality of the electrode materials for a lithium ion secondary battery, an electrode for a lithium ion secondary battery containing the electrode material granulated body for a lithium ion secondary battery, and a lithium ion secondary battery including the electrode for a lithium ion secondary battery.

Means for Solving the Problem

As a result of intensive studies for solving the above-described problem, the present inventors found that, when an electrode material for a lithium ion secondary battery includes an electrode active material and a carbonaceous film that coats a surface of the electrode active material, wherein a hydroxy group and at least one selected from a carboxyl group, a nitro group, and a sulfo group are introduced to an outermost surface of the carbonaceous film that faces the electrode active material, and wherein, when a surface of the carbonaceous film is analyzed through time-of-flight secondary ion mass spectrometry, a ratio of a total of count numbers of at least one selected from the carboxyl group, the nitro group, and the sulfo group to a count number of the hydroxy group is 0.001 or more and 10.000 or less, a coating ratio of the carbonaceous film is set to 40% or more and 90% or less, and the carbonaceous film has at least one through-hole per 100 square nanometers of the carbonaceous film, it is possible to obtain an electrode material for a lithium ion secondary battery which has a high electron conductivity and an excellent diffusivity of lithium ions and enables improvement of a battery service life, an electrode for a lithium ion secondary battery including the electrode material is excellent in terms of electron conductivity and lithium ion diffusivity, and, when the electrode material is used as a lithium ion secondary battery, input and output characteristics, charge and discharge cycle characteristics, and low-temperature characteristics of a battery improve and completed the present invention.

An electrode material for a lithium ion secondary battery of the present invention is an electrode material for a lithium ion secondary battery including an electrode active material and a carbonaceous film that coats a surface of the electrode active material, in which a hydroxy group and a group which is at least one selected from a carboxyl group, a nitro group, and a sulfo group have been introduced to an outermost surface of the carbonaceous film, a ratio of a total count number of the group which is at least one selected from the carboxyl group, the nitro group, and the sulfo group, to a count number of the hydroxy group is 0.001 or more and 10.000 or less when a surface of the carbonaceous film is analyzed through time-of-flight secondary ion mass spectrometry to obtain the ratio, a coating ratio of the carbonaceous film is 40% or more and 90% or less, and the carbonaceous film has at least one through-hole per 100 square nanometers of the carbonaceous film.

An electrode material granulated body for a lithium ion secondary battery of the present invention is formed by agglomerating and granulating a plurality of the electrode materials for a lithium ion secondary battery of the present invention.

An electrode for a lithium ion secondary battery of the present invention is an electrode for a lithium ion secondary battery including an electrode current collector and an electrode mixture layer formed on the electrode current collector, in which the electrode mixture layer contains the electrode material granulated body for a lithium ion secondary battery of the present invention.

A lithium ion secondary battery of the present invention is a lithium ion secondary battery having a cathode, an anode, and a non-aqueous electrolyte, in which the cathode is the electrode for a lithium ion secondary battery of the present invention.

Advantage of the Invention

According to the present invention, it is possible to provide an electrode material for a lithium ion secondary battery which has a high electron conductivity and an excellent diffusivity of lithium ions and enables improvement of a battery service life.

According to the electrode material granulated body for a lithium ion secondary battery of the present invention, it is possible to provide an electrode material granulated body for a lithium ion secondary battery which has a high electron conductivity and an excellent diffusivity of lithium ions and enables improvement of a battery service life.

According to the electrode for a lithium ion secondary battery of the present invention, the electrode material granulated body for a lithium ion secondary battery is contained, and thus it is possible to provide a lithium ion secondary battery having excellent input and output characteristics and excellent charge and discharge rate performance at room temperature.

According to the lithium ion secondary battery of the present invention, the electrode for a lithium ion secondary battery of the present invention is provided, and thus it is possible to provide a lithium ion secondary battery capable of high-speed charge and discharge.

BEST MODE FOR CARRYING OUT THE INVENTION

An embodiment of an electrode material for a lithium ion secondary battery, an electrode material granulated body for a lithium ion secondary battery, an electrode for a lithium ion secondary battery, and a lithium ion secondary battery of the present invention will be described.

Meanwhile, the present embodiment is specific description for the better understanding of a gist of the invention and, unless particularly otherwise described, does not limit the present invention.

[Electrode Material for Lithium Ion Secondary Battery]

An electrode material for a lithium ion secondary battery of the present embodiment (hereinafter, also abbreviated as the "electrode material" in some cases) is an electrode material for a lithium ion secondary battery including an electrode active material and a carbonaceous film that coats a surface of the electrode active material, in which a hydroxy group and at least one selected from a carboxyl group, a nitro group, and a sulfo group are introduced to an outermost surface of the carbonaceous film that faces the electrode active material, in a case in which a surface of the carbonaceous film is analyzed through time-of-flight secondary ion mass spectrometry, a ratio of a total of count numbers of at least one selected from the carboxyl group, the nitro group, and the sulfo group to a count number of the hydroxy group is 0.001 or more and 10.000 or less, a coating ratio of the carbonaceous film is set to 40% or more and 90% or less, and the carbonaceous film has at least one through-hole per 100 square nanometers of the carbonaceous film.

In the electrode material of the present embodiment, in the case of carrying out an analysis through time-of-flight secondary ion mass spectrometry (TOF-SIMS), the ratio of the total of the count numbers of at least one selected from the carboxyl group, the nitro group, and the sulfo group to the count number of the hydroxy group (hereinafter, also referred to as the "functional group ratio" in some cases) is 0.001 or more and 10.000 or less, preferably 0.050 or more and 5.000 or less, and more preferably 0.020 or more and 1.000 or less.

Here, the reasons for setting the functional group ratio in the above-described range are as described below. When the functional group ratio is less than 0.001, a force of pulling a polar molecule having a dipole moment present in an electrolyte such as water ($H_2O$) or hydrogen fluoride (HF) toward a carbonaceous film side is too weak, and a service life of a lithium ion secondary battery deteriorates. Meanwhile, when the functional group ratio exceeds 10.000, a conductivity of the carbonaceous film becomes too low, and the input and output characteristics of the lithium ion secondary battery degrade.

A functionalization ratio is calculated on the basis of a result of an analysis carried out using a time-of-flight secondary ion mass spectrometer manufactured by Ulvac-PHI, Inc. (trade name: PHI nano TOF) under conditions of a primary ion of $Bi^{3++}$, an accelerated voltage of 30 kV, an ion current of approximately 0.1 nA, an analysis area of 100 μm, and an analysis time of 30 minutes. In this analysis, the count number of the hydroxy groups (—OH) is a count number obtained with a mass number of 17. In addition, the total of the count numbers of at least one selected from the carboxyl group (—COOH), the nitro group (—$NO_2$), and the sulfo group (—$SO_3H$) is a count number obtained as the total of a series of detections having peaks at mass numbers of 45, 46, and 80 respectively. A value obtained by dividing the total of the count numbers of at least one selected from the carboxyl group, the nitro group, and the sulfo group by the count number of the hydroxy group is considered as the functionalization ratio.

Here, the count number indicates the number of times of detection of a mass corresponding to each functional group when a shattering substance sputtered using an ion gun is detected using a time-of-flight secondary ion mass spectrometer for an analysis time of 30 minutes.

Meanwhile, the ratio of the total of the count numbers of the carboxyl group, the nitro group, and the sulfo group to the count number of the hydroxy group is 0.001 or more and 10.000 or less, the ratio of the sum of the count number of the hydroxy group and the total of the count numbers of at least one selected from the carboxyl group, the nitro group, and the sulfo group to the count number of the surfaces of the carbonaceous film is preferably 0.01 or more and 1.00 or less, more preferably 0.10 or more and 0.50 or less, and still more preferably 0.15 or more and 0.20 or less.

Here, the count number of the surfaces of the carbonaceous film refers to the total of the count numbers of detection components mainly including carbon such as C, CH, and $C_2H$.

In the electrode material of the present embodiment, a coating ratio of the carbonaceous film is 40% or more and 90% or less, preferably 50% or more and 85% or less, and more preferably 60% by mass or more and 80% or less.

Here, the reasons for setting the coating ratio of the carbonaceous film in the above-described range are as described below. When the coating ratio of the carbonaceous film is less than 40%, the electron conductivity of the electrode material becomes insufficient. Meanwhile, when the coating ratio of the carbonaceous film exceeds 90%, a charge migration resistance in the carbonaceous film increases, and the input and output characteristics of the lithium ion secondary battery degrade.

The coating ratio of the carbonaceous film is calculated on the basis of a result of an analysis carried out using a time-of-flight secondary ion mass spectrometer manufactured by Ulvac-PHI, Inc. (trade name: PHI nano TOF) under conditions of a primary ion of $Bi^{3++}$, an accelerated voltage of 30 kV, an ion current of approximately 0.1 nA, an analysis area of 100 μm, and an analysis time of 30 minutes. In this analysis, as a result of analyzing the surfaces of primary particles made of the electrode active material and the carbonaceous film, an area in which a meaningful amount of lithium ions are detected in the entire measurement area is considered as an exposure proportion of the electrode active material, an area in which a meaningful amount of lithium ions are not detected is considered as a proportion of the carbonaceous film, and the coating ratio of carbon is calculated. Meanwhile, the detection of a meaningful amount of lithium ions relies on a measurement accuracy of an analyzer; however, under the above-described measurement conditions, a meaningful amount of lithium ions are considered as detected in a place in which the count number of lithium ions exceeds 10 counts.

Meanwhile, the meaningful amount refers to an amount exceeding a small count being detected in almost all of the surface (background). Here, a count number of approximately ten is considered as the background.

In the electrode material of the present embodiment, the carbonaceous film has at least one through-hole per 100 square nanometers of the carbonaceous film, preferably has at least five or more through-hole per 100 square nanometers of the carbonaceous film and more preferably has 10 or more through-hole per 100 square nanometers of the carbonaceous film. In addition, in the carbonaceous film, an upper limit of the number of through-holes per 100 square nanometers of the carbonaceous film may be 100,000 or less, may be 10,000 or less, and may be 1,000 or less.

Here, the reasons for the carbonaceous film having at least one through-hole per 100 square nanometers of the carbonaceous film are as described below.

When the carbonaceous film has at least one through-hole per 100 square nanometers of the carbonaceous film, at least one of lithium ions and lithium ions constituting a solvent together with an electrolyte become capable of easily migrating in the carbonaceous film. When the carbonaceous film does not have at least one through-hole per 100 square nanometers of the carbonaceous film, the charge migration resistance in the carbonaceous film increases, and the input and output characteristics of the lithium ion secondary battery degrade.

The number of through-holes per 100 square nanometers of the carbonaceous film is calculated on the basis of a result of an analysis carried out using a time-of-flight secondary ion mass spectrometer manufactured by Ulvac-PHI, Inc. (trade name: PHI nano TOF) under conditions of a primary ion of $Bi^{3++}$, an accelerated voltage of 30 kV, an ion current of approximately 0.1 nA, an analysis area of 100 μm, and an analysis time of 30 minutes. In this analysis, as a result of analyzing the surfaces of the primary particles made of the electrode active material and the carbonaceous film, in a region in which a meaningful amount of lithium ions are detected in the entire measurement area, the electrode active material is considered to be exposed, and a region in which a meaningful amount of lithium ions are detected in the carbonaceous film is considered as a through-hole. Meanwhile, the detection of a meaningful amount of lithium ions relies on a measurement accuracy of an analyzer; however, under the above-described measurement conditions, a meaningful amount of lithium ions are considered as detected in a place in which the count number of lithium ions exceeds 10 counts.

Meanwhile, in the carbonaceous film, the through-hole is preferably formed in a vertical direction with respect to the surface of the electrode active material, but the through-hole may be formed to be inclined from the vertical direction with respect to the surface of the electrode active material, or the through-hole may be curved.

In the electrode material of the present embodiment, a ratio of a diameter of an opening portion present on the surface of the carbonaceous film in the through-hole to an average film thickness of the carbonaceous film is preferably 0.5 or more and 10.0 or less, more preferably 1.0 or more and 8.0 or less, and still more preferably 2.0 or more and 5.0 or less.

When the ratio of the diameter of the opening portion present on the surface of the carbonaceous film in the through-hole to the average film thickness of the carbonaceous film is set in the above-described range, it is possible to obtain an electrode material for a lithium ion secondary battery which has a high electron conductivity and an excellent diffusivity of lithium ions and enables improvement of a battery service life.

Here, the reasons for setting the ratio of the diameter of the opening portion present on the surface of the carbonaceous film in the through-hole to the average film thickness of the carbonaceous film in the above-described range are as described below.

When the ratio of the diameter of the opening portion present on the surface of the carbonaceous film in the through-hole to the average film thickness of the carbonaceous film is 0.5 or more, at least one of lithium ions and lithium ions constituting a solvent together with an electrolyte become capable of easily migrating in the carbonaceous film, the charge migration resistance in the carbonaceous film decreases, and the input and output characteristics of the lithium ion secondary battery improve. Meanwhile, when the ratio of the diameter of the opening portion present on the surface of the carbonaceous film in the through-hole to the average film thickness of the carbonaceous film is 10.0 or less, the contact frequency between hydrogen fluoride present in the electrode and the electrode active material is decreased, the deterioration of the electrode active material is suppressed, and thus it is possible to improve the service life of the lithium ion secondary battery.

The diameter of the opening portion present on the surface of the carbonaceous film in the through-hole is measured as a spot diameter of a detection place of lithium ions based on a result of a surface analysis using a time-of-flight secondary ion mass spectrometer.

In the electrode material of the present embodiment, the average film thickness of the carbonaceous film is preferably 1.0 nm or more and 7.0 nm or less and more preferably 3.0 nm or more and 5.0 nm or less.

Here, the reasons for setting the average film thickness of the carbonaceous film in the above-described range are as described below. When the average film thickness of the carbonaceous film is 1.0 nm or more, there are no cases in which the charge migration resistance in the carbonaceous film increases. As a result, there are no cases in which an internal resistance of the lithium ion secondary battery increases, and voltage drop at a high charge-discharge rate of the lithium ion secondary battery does not easily occur. Meanwhile, when the average film thickness of the carbonaceous film is 7.0 nm or less, there are no cases in which the charge migration resistance by a steric barrier increases during the diffusion of lithium ions in the carbonaceous film. As a result, there are no cases in which the internal resistance of the lithium ion secondary battery increases, and voltage drop at a high charge-discharge rate of the lithium ion secondary battery does not easily occur.

The average film thickness of the carbonaceous film is obtained by observing the carbonaceous film of the electrode material using a transmission electron microscope (TEM) and measuring an average value of carbonaceous film thicknesses of 100 different particles in the electrode material.

A size of the electrode active material coated with the carbonaceous film is not particularly limited, but an average primary particle diameter is preferably 0.05 μm or more and 10 μm or less and more preferably 0.06 μm or more and 3 μm or less.

When the average primary particle diameter is in the above-described range, it is easy to uniformly coat surfaces of crystal grains of the electrode active material with the carbonaceous film, it is possible to substantially increase the discharge capacity of the lithium ion secondary battery at a high charge-discharge rate, and it is possible to realize a sufficient charge and discharge performance in the lithium ion secondary battery.

Meanwhile, when the average primary particle diameter of the electrode active material coated with the carbonaceous film is less than 0.05 μm, it becomes difficult to uniformly coat the surfaces of the crystal grains of the electrode active material with the carbonaceous film. Therefore, the charge migration resistance of the crystal grains of the electrode active material that are not uniformly coated with carbon in a surface region of the carbonaceous film increases. Particularly, in the case of carrying out charging and discharging at a high speed, a battery voltage reaches upper and lower limit voltages of charging and discharging before the intercalation and deintercalation of lithium ions is completed in a region having a high charge migration resistance on the surface region of the carbonaceous film. Therefore, the discharge capacity of the lithium ion secondary battery substantially decreases, and it becomes difficult to realize a sufficient charge and discharge performance in the lithium ion secondary battery. In addition, when the average primary particle diameter of the electrode active material coated with the carbonaceous film exceeds 10 µm, a lithium ion diffusion resistance in the crystal grains of the electrode active material becomes large enough to become a rate-limiting factor of a charge and discharge reaction. Particularly, in the case of carrying out charging and discharging at a high speed, the battery voltage reaches the upper and lower limit voltages of charging and discharging before the intercalation and deintercalation of lithium ions is completed in the region having a high charge migration resistance on the surface region of the carbonaceous film. Therefore, the discharge capacity of the lithium ion secondary battery substantially decreases, and it becomes difficult to realize a sufficient charge and discharge performance in the lithium ion secondary battery.

Here, the average particle diameter refers to a volume-average particle diameter. The average primary particle diameter of the electrode active material coated with the carbonaceous film in the present embodiment (hereinafter, referred to as "carbon coated electrode active material") is obtained by obtaining an average value of long-axis diameters of 100 primary particles that are obtained using a scanning electron microscopic (SEM) image and randomly selected.

A shape of the carbon coated electrode active material is not particularly limited, but is preferably at least one selected from the group consisting of a spherical shape, a substantially spherical shape, a bale-like shape, a rice grain shape, a columnar shape, a substantially columnar shape, a cubic shape and a substantially cubic shape. That is, all of the carbon coated electrode active material may have the same shape or two or more shapes in a mixed form.

Here, the reason for the shape of the carbon coated electrode active material being preferably at least one selected from the group consisting of a spherical shape, a substantially spherical shape, a bale-like shape, a rice grain shape, a columnar shape, a substantially columnar shape, a cubic shape and a substantially cubic shape is that the adjustment of an electrode density becomes easy when the electrode for a lithium ion secondary battery is formed by mixing the carbon coated electrode active material, a binder resin (binding agent), and a conductive auxiliary agent.

In addition, even when a granulated body made of substantially spherical secondary particles is prepared by agglomerating a plurality of primary particles (electrode material) of the carbon coated electrode active material, the shape of the carbon coated electrode active material is preferably at least one selected from the group consisting of a spherical shape, a substantially spherical shape, a bale-like shape, a rice grain shape, a columnar shape, a substantially columnar shape, a cubic shape and a substantially cubic shape. The reason therefor is that a filling property of the secondary particles can be enhanced. In addition, it is possible to decrease the amount of a solvent used to prepare an electrode material mixture by mixing the electrode material, the binder resin (binding agent), the conductive auxiliary agent, and the solvent. In addition, the application of the electrode material mixture to the electrode current collector also becomes easy.

An amount of carbon in the electrode material of the present embodiment is preferably 0.8% by mass or more and 3.5% by mass or less, more preferably 1.0% by mass or more and 2.5% by mass or less, and still more preferably 1.1% by mass or more and 1.7% by mass or less of a mass percentage (in the case of setting the total amount of the carbon coated electrode active material to 100% by mass) of the carbon coated electrode active material.

When the amount of carbon is 0.8% by mass or more, the coating ratio of the carbonaceous film on the surface of the electrode active material exceeds 40%, and thus, in the case of forming the lithium ion secondary battery, the discharge capacity of the lithium ion secondary battery at a high charge-discharge rate increases. As a result, the lithium ion secondary battery becomes capable of realizing a sufficient charge and discharge rate performance. Meanwhile, when the amount of carbon is 3.5% by mass or less, there are no cases in which the charge migration resistance by a steric barrier increases during the diffusion of lithium ions in the carbonaceous film. As a result, there are no cases in which the internal resistance of the lithium ion secondary battery increases, and voltage drop of the lithium ion secondary battery at a high charge-discharge rate does not easily occur.

The content of carbon in the electrode material of the present embodiment is measured using a carbon analyzer (carbon/sulfur combustion analyzer: EMIA-810W (trade name) manufactured by Horiba Ltd.).

A specific surface area of the electrode material of the present embodiment is preferably 5 $m^2/g$ or more and 40 $m^2/g$ or less and more preferably 9 $m^2/g$ or more and 30 $m^2/g$ or less.

When the specific surface area is 5 $m^2/g$ or more, the average film thickness of the carbonaceous film reaches 7.0 nm or less in a case in which the amount of carbon in the electrode material of the present embodiment is 3.5% by mass. Meanwhile, when the specific surface area is 40 $m^2/g$ or less, the average film thickness of the carbonaceous film reaches 1.0 nm or less in a case in which the amount of carbon in the electrode material of the present embodiment is 0.8% by mass.

The specific surface area of the electrode material of the present embodiment is measured using a specific surface area meter and a BET method by means of nitrogen ($N_2$) adsorption.

In the electrode material of the present embodiment, a density of the carbonaceous film, which is calculated using a carbon component constituting the carbonaceous film, is preferably 0.3 $g/cm^3$ or more and 1.5 $g/cm^3$ or less and more preferably 0.4 $g/cm^3$ or more and 1.0 $g/cm^3$ or less. The density of the carbonaceous film, which is calculated using the carbon component constituting the carbonaceous film, refers to a mass of the carbonaceous film per unit volume in a case in which the carbonaceous film is constituted of carbon alone.

When the density of the carbonaceous film is 0.3 $g/cm^3$ or more, the carbonaceous film exhibits a sufficient electron conductivity. Meanwhile, when the density of the carbonaceous film is 1.5 $g/cm^3$ or less, a content of fine crystals of graphite made of a lamellar structure in the carbonaceous film is small, and thus a steric barrier caused by the fine crystals of graphite is not generated during the diffusion of lithium ions in the carbonaceous film. Therefore, there are no cases in which the charge migration resistance increases. As a result, there are no cases in which the internal resistance of the lithium ion secondary battery increases, and voltage drop of the lithium ion secondary battery does not easily occur at a high charge-discharge rate.

In the electrode material of the present embodiment, the mass of the carbon component constituting the carbonaceous film is preferably 50% by mass or more and more preferably 60% by mass or more of a total mass (100% by mass) of the carbonaceous film.

The carbonaceous film is a film generated by the thermal decomposition of a carbonaceous source that is a precursor of carbon and includes, in addition to carbon, an element such as hydrogen or oxygen. When a calcination temperature during the manufacturing of the electrode material is 500° C. or lower, the mass of the carbon component occupying the total mass of the carbonaceous film becomes less than 50% by mass, and the charge migration resistance of the carbonaceous film increases. As a result, the internal resistance of the lithium ion secondary battery increases, and voltage drop of the lithium ion secondary battery at a high charge-discharge rate becomes significant.

"Electrode Active Material"

As the electrode active material, a compound represented by General Formula $Li_aA_bD_cPO_4$ (here, A represents at least one selected from the group consisting of Fe, Mn, Co, and Ni, D represents at least one selected from the group consisting of Mg, Ca, Sr, Ba, Ti, Zn, B, Al, Ga, In, Si, Ge, Sc, Y, and a rare earth element, $0 \le a \le 1.0$, $0 < b \le 1.0$, and $0 \le c \le 0.4$), $LiCoO_2$, $LiMn_2O_4$, $LiNiO_2$, $LiNi_\alpha Co_\beta Mn_\gamma O_2$ ($0.5 \le \alpha+\beta+\gamma \le 1.5$), and the like are exemplified. Among these, from the viewpoint of a high discharge capacity and a high energy density, the compound represented by General Formula $Li_aA_bD_cPO_4$ (here, A represents at least one selected from the group consisting of Fe, Mn, Co, and Ni, D represents at least one selected from the group consisting of Mg, Ca, Sr, Ba, Ti, Zn, B, Al, Ga, In, Si, Ge, Sc, Y, and a rare earth element, $0 \le a \le 1.0$, $0 < b \le 1.0$, and $0 \le c \le 0.4$) is preferred.

A is preferably Fe, Mn, or Co and more preferably Fe.

D is preferably Mg, Ca, Sr, Ba, Ti, Zn, or Al and more preferably Mg.

In addition, the rare earth element refers to 15 elements of La, Ce, Pr, Nd, Pm, Sm, Eu, Gd, Tb, Dy, Ho, Er, Tm, Yb, and Lu which belong to the lanthanum series.

Examples of the compound represented by General Formula $Li_aA_bD_cPO_4$ (hereinafter, also referred to as the "compound A") include $LiFePO_4$, $LiMnPO_4$, $LiCoPO_4$, $LiNiPO_4$, $LiFe_{0.5}Mn_{0.5}PO_4$, $LiFe_{0.4}Mn_{0.6}PO_4$, $LiFe_{0.3}Mn_{0.7}PO_4$, $LiFe_{0.2}Mn_{0.8}PO_4$, $LiFe_{0.1}Mn_{0.9}PO_4$, $LiFe_{0.265}Co_{0.005}Mg_{0.03}Mn_{0.7}PO_4$, and the like.

In addition, the electrode active material preferably contains the compound represented by General Formula $Li_aA_bD_cPO_4$ and a compound represented by General Formula $Li_eC_fPO_4$ (here, C represents at least one selected from Fe and Mn, $0 \le e < 2$, $0 < f < 1.5$, and which is different from the compound represented by General Formula $Li_aA_bD_cPO_4$) which is present on a surface of the compound represented by General Formula $Li_aA_bD_cPO_4$.

C is preferably Fe.

In a case in which the electrode active material contains these elements, it is possible to realize an electrode mixture layer which has excellent input and output characteristics and a high energy density and, furthermore, is capable of realizing a high safety. In addition, these elements have an abundant amount of a source and are thus preferable as a selective material.

Examples of the compound represented by General Formula $Li_eC_fPO_4$ (hereinafter, also referred to as the "compound B") include $LiFePO_4$, $Li_2FePO_4$, $LiMnPO_4$, $Li_2MnPO_4$, $LiFe_{0.5}Mn_{0.5}PO_4$, $LiFe_{0.4}Mn_{0.6}PO_4$, $LiFe_{0.3}Mn_{0.7}PO_4$, $LiFe_{0.2}Mn_{0.8}PO_4$, $LiFe_{0.1}Mn_{0.9}PO_4$, $Li_2Fe_{0.5}Mn_{0.5}PO_4$, $Li_2Fe_{0.4}Mn_{0.6}PO_4$, $Li_2Fe_{0.3}Mn_{0.7}PO_4$, $Li_2Fe_{0.2}Mn_{0.8}PO_4$, $Li_2Fe_{0.1}Mn_{0.9}PO_4$, and the like. Here, the compound B is a different compound from the compound A.

When the electrode active material includes the compound A and the compound B present on a surface of the compound A, for example, even in a case in which the compound A is a material that does not easily form the carbonaceous film on the surface of the electrode active material such as $LiMnPO_4$, $LiCoPO_4$, or $LiNiPO_4$, it becomes possible to form the carbonaceous film on the surface of the electrode active material due to the compound B interposed therebetween. That is, in a case in which the electrode active material includes the compound A and the compound B, the carbonaceous film is formed on the surface of the compound A, the surface of the compound B, or the surfaces of the compound A and the compound B.

In a case in which the electrode active material includes the compound A and the compound B, a ratio between the compound A and the compound B in molar ratio is preferably 99.9:0.1 to 90.0:10.0 and more preferably 99.5:0.5 to 95.0:5.0.

A size of the electrode active material is not particularly limited, but an average primary particle diameter is preferably 0.01 μm or more and 9 μm or less and more preferably 0.04 μm or more and 3 μm or less.

When the average primary particle diameter of the electrode active material is in the above-described range, it is easy to uniformly coat the surfaces of the crystal grains of the electrode active material with the carbonaceous film. As a result, it is possible to substantially increase the discharge capacity of the lithium ion secondary battery at a high charge-discharge rate, and it is possible to realize a sufficient charge and discharge performance in the lithium ion secondary battery.

Meanwhile, when the average primary particle diameter of the electrode active material is less than 0.01 μm, it becomes difficult to uniformly coat the surfaces of the crystal grains of the electrode active material with the carbonaceous film. As a result, at a high charge-discharge rate of the lithium ion secondary battery, the charge migration resistance of the crystal grains of the electrode active material that are not uniformly coated with carbon in a surface region of the carbonaceous film increases. Particularly, in the case of carrying out charging and discharging at a high speed, the battery voltage reaches the upper and lower limit voltages of charging and discharging before the intercalation and deintercalation of lithium ions is completed in a region having a high charge migration resistance in the surface region of the carbonaceous film. Therefore, the discharge capacity of the lithium ion secondary battery substantially decreases, and it becomes difficult to realize a sufficient charge and discharge performance in the lithium ion secondary battery. In addition, when the average primary particle diameter of the electrode active material coated with the carbonaceous film exceeds 9 μm, a lithium ion diffusion resistance in the crystal grains of the electrode active material becomes large enough to become a rate-limiting factor of a charge and discharge reaction. Particularly, in the case of carrying out charging and discharging at a high speed, the battery voltage reaches the upper and lower limit voltages of charging and discharging before the intercalation and deintercalation of lithium ions is completed in the region having a high charge migration resistance in the surface region of the carbonaceous film. Therefore, the discharge capacity of the lithium ion secondary battery substantially decreases, and it becomes difficult to realize a sufficient charge and discharge performance.

Here, the average particle diameter refers to a volume-average particle diameter. The average primary particle diameter of the primary particles of the electrode active material in the present embodiment is obtained by obtaining an average value of long-axis diameters of 100 primary particles that are obtained using a scanning electron microscopic (SEM) image and randomly selected.

In addition, the crystal grain refers to a particle made of a single crystallite, that is, a single crystal particle. In a case in which a majority of the electrode active material or the electrode material is made of an aggregate of single crystal particles, the crystal grain becomes equal to the primary particle, and the crystallite diameter becomes equal to the primary particle diameter.

The crystallite diameter can be calculated using the Rietveld method or the Scherrer equation from a result of X-ray diffraction measurement (X-ray Diffraction: XRD). However, for a particle having a crystallite diameter of more than 0.2 μm, a calculation accuracy of the crystallite diameter based on the X-ray diffraction measurement result becomes low, and thus the average primary particle diameter based on a scanning electron microscopic image and the crystallite diameter are considered to be equal to each other.

A shape of the electrode active material is not particularly limited, but is preferably at least one selected from the group consisting of a spherical shape, a substantially spherical shape, a bale-like shape, a rice grain shape, a columnar shape, a substantially columnar shape, a cubic shape and a substantially cubic shape, more preferably a spherical shape, and particularly preferably a truly spherical shape. When the shape of the electrode active material is a truly spherical shape, an electrode material obtained by the formation of secondary particles by the electrode active material coated with the carbonaceous film is likely to form spherical secondary particles.

Here, the reason for the shape of the electrode active material being preferably a spherical shape is that it is possible to decrease the amount of a solvent used to prepare the electrode material mixture by mixing the electrode active material, the binder resin (binding agent), and the solvent, and the application of the electrode material mixture to the electrode current collector also becomes easy.

In addition, when the shape of the electrode active material is a spherical shape, a surface area of the electrode active material is minimized, and it is possible to minimize an amount of the binder resin (binding agent) blended which is added to the electrode material mixture. As a result, it is possible to decrease an internal resistance of an electrode to be obtained.

Furthermore, when the shape of the electrode active material is a spherical shape, it becomes easy to closely pack the electrode material during the application of the electrode material mixture to the electrode current collector, an amount of the electrode material closely packed per unit volume increases. Therefore, the electrode density can be increased, and consequently, it is possible to increase the capacity of the lithium ion secondary battery.

"Carbonaceous Film"

A source of carbon that serves as a raw material of the carbonaceous film is preferably derived from an organic compound having a purity of carbon of 42.00% or more and 60.00% or less.

As a method for calculating "the purity of carbon" of the source of carbon that serves as a raw material of the carbonaceous film in the electrode material for a lithium ion secondary battery of the present embodiment, in a case of a plurality of kinds of organic compounds is used, a method in which amounts (% by mass) of carbon in amounts of the respective organic compounds blended are calculated and summed from the amounts (% by mass) of the respective organic compounds blended and a well-known purity (%) of carbon and the purity of carbon is calculated according to Expression (1) using a total amount (% by mass) of the organic compounds blended and a total amount (% by mass) of carbon is used.

$$\text{Purity (\%) of carbon} = \text{total amount (\% by mass) of carbon/total amount blended (\% by mass)} \times 100 \quad (1)$$

In the electrode material for a lithium ion secondary battery of the present embodiment, in a case in which the electrode active material includes the compound A and the compound B present on the surface thereof, there are cases in which the surface of the compound A and the surface of the compound B are coated with the carbonaceous film. In this case, 30% or more of the surface of at least the compound A constituting the electrode active material is preferably coated with the carbonaceous film, and 35% or more of the surface of at least the compound A constituting the electrode active material is more preferably coated with the carbonaceous film. In addition, 50% or more of the surface of the compound B constituting the electrode active material is preferably coated with the carbonaceous film, and 70% or more of the surface of the compound B constituting the electrode active material is more preferably coated with the carbonaceous film.

According to the electrode material for a lithium ion secondary battery of the present embodiment, in an electrode material for a lithium ion secondary battery including an electrode active material and a carbonaceous film that coats a surface of the electrode active material, when a hydroxy group and at least one selected from a carboxyl group, a nitro group, and a sulfo group are introduced to an outermost surface of the carbonaceous film that faces the electrode active material, in a case in which a surface of the carbonaceous film is analyzed through time-of-flight secondary ion mass spectrometry, a ratio of a total of count numbers of at least one selected from the carboxyl group, the nitro group, and the sulfo group to a count number of the hydroxy group is 0.001 or more and 10.000 or less, a coating ratio of the carbonaceous film is set to 40% or more and 90% or less, and the carbonaceous film has at least one through-hole per 100 square nanometers of the carbonaceous film, in the case of constituting a lithium ion secondary battery using this electrode material for a lithium ion secondary battery, at least one selected from the carboxyl group, the nitro group, and the sulfo group pulls a polar molecule having a dipole moment present in an electrolyte such as water ($H_2O$) or hydrogen fluoride (HF) due to an intermolecular force that is one of external forces exerting between molecules having a dipole moment, the contact frequency between hydrogen fluoride and the electrode active material decreases, and the deterioration of the electrode active material can be suppressed. As a result, it is possible to improve the service life of the lithium ion secondary battery, and additional improvement of both characteristics of the electron conductivity and the diffusivity of lithium ions becomes possible.

[Electrode Material Granulated Body for Lithium Ion Secondary Battery]

An electrode material granulated body for a lithium ion secondary battery of the present embodiment (hereinafter, also referred to as "electrode material granulated body" in some cases) is a granulated body formed by agglomerating and granulating a plurality of the electrode materials of the present embodiment.

The electrode material granulated body of the present embodiment is preferably a granulated body (secondary particles) formed by agglomerating and granulating a plurality of electrode materials for a lithium ion secondary battery including at least one of crystal grains made of the above-described electrode active material (at least one of crystal grains made only of the compound represented by General Formula $Li_aA_bD_cPO_4$ and crystal grains made up of the compound represented by General Formula $Li_eC_fPO_4$) or primary particles made of the above-described electrode active material (at least one of particles made only of the compound represented by General Formula $Li_aA_bD_cPO_4$ and particles made up of the compound represented by General Formula $Li_eC_fPO_4$) and a carbonaceous film that coats surfaces thereof through the carbonaceous film.

An average particle diameter (average secondary particle diameter) of the electrode material granulated body of the present embodiment is preferably 0.3 µm or more and 50 µm or less and more preferably 1 µm or more and 30 µm or less.

When the average secondary particle diameter of the electrode material granulated body is preferably 0.3 µm or more, in the formation of the electrode for a lithium ion secondary battery, a sufficient adhesion strength between the electrode current collector and the electrode active material coated with the carbonaceous film is obtained, the amount of the binder resin blended becoming excessive is prevented, and it is possible to increase the discharge capacity of the lithium ion secondary battery. Meanwhile, when the average secondary particle diameter of the electrode material granulated body is 50 µm or less, in the case of forming the electrode for a lithium ion secondary battery, it is possible to prevent the easy occurrence of a distribution of the density of the electrode material in the electrode. Therefore, it is possible to prevent the generation of a difference in the deterioration rate of the electrode material in a microscopic region of the electrode.

Here, the average secondary particle diameter of the electrode material granulated body refers to the number-average particle diameter of the electrode material granulated body. The average secondary particle diameter of the electrode material granulated body can be measured using a laser diffraction/scattering particle size distribution analyzer or the like.

A volume density of the electrode material granulated body of the present embodiment is preferably 30% by volume or more and 70% by volume or less of a volume density in a case in which the electrode material granulated body is assumed to be solid.

Here, the solid electrode material granulated body refers to a granulated body in which pores are not present, and a density of the solid electrode material granulated body is equal to a theoretical density of the electrode material.

In addition, the electrode material granulated body of the present embodiment refers to an agglomerate in a state in which the carbon coated electrode active material particles are agglomerated through the carbonaceous film in a point-contact state, each of contact portions between the carbon coated electrode active material particles forms a neck shape having a small cross-sectional area, and the carbon coated electrode active material particles are strongly connected together. As described above, each of the contact portions between the carbon coated electrode active material particles forms a neck shape having a small cross-sectional area, and thus the electrode material granulated body of the present embodiment becomes a structure in which channel-like (network-like) pores spread three-dimensionally in the agglomerate.

Meanwhile, when the volume density of the electrode material granulated body of the present embodiment is 30% by volume or more of the volume density in a case in which the electrode material granulated body is assumed to be solid, the electrode material granulated body is densified, and thus a mechanical strength of the electrode material granulated body increases. For example, in the preparation of the electrode material mixture by mixing the electrode material granulated body, the binder resin (binding agent), the conductive auxiliary agent, and the solvent, the electrode material granulated body does not easily break. As a result, an increase in a viscosity of the electrode material mixture is suppressed, and a fluidity is maintained. Therefore, it is possible to improve a coatability of the electrode material mixture, and it is also possible to improve the filling property of the electrode active material in a coated film made of the electrode material mixture. In a case in which the electrode material granulated body breaks in the preparation of the electrode material mixture, the amount of the binder resin blended to bond the electrode active material particles increases. Therefore, the viscosity of the electrode material mixture increases, a concentration of a solid content in the electrode material mixture decreases, and a ratio of the electrode material in the electrode mixture layer formed using the electrode material mixture decreases.

In addition, when the volume density of the electrode material granulated body of the present embodiment is 70% by volume or less of the volume density in a case in which the electrode material granulated body is assumed to be solid, a sufficient number of conduction paths for lithium ions for driving the battery are formed in the electrode material granulated body during the production of a lithium ion secondary battery.

In a case in which the electrode active material of the present embodiment includes the compound A and the compound B present on the surface thereof, there are cases in which the surface of the compound A and the surface of the compound B are coated with the carbonaceous film. In this case, 30% or more of the surface of at least the compound A constituting the electrode active material is preferably coated with the carbonaceous film, and 35% or more of the surface of at least the compound A constituting the electrode active material is more preferably coated with the carbonaceous film. In addition, 50% or more of the surface of the compound B constituting the electrode active material is preferably coated with the carbonaceous film, and 70% or more of the surface of the compound B constituting the electrode active material is more preferably coated with the carbonaceous film.

According to the electrode material granulated body for a lithium ion secondary battery of the present embodiment, it is possible to provide an electrode material granulated body for a lithium ion secondary battery which has a high electron conductivity and an excellent diffusivity of lithium ions and enables the improvement of the battery service life

[Method for Manufacturing Electrode Active Material or Precursor of Electrode Active Material]

Examples of a method for manufacturing the electrode active material or a precursor of the electrode active material that is used in the present embodiment include a method for manufacturing an electrode active material made of the compound represented by General Formula $Li_aA_bD_cPO_4$ (here, A represents at least one selected from the group consisting of Fe, Mn, Co, and Ni, D represents at least one selected from the group consisting of Mg, Ca, Sr, Ba, Ti, Zn, B, Al, Ga, In, Si, Ge, Sc, Y, and a rare earth element, $0 \le a \le 1.0$, $0 < b \le 1.0$, and $0 \le c \le 0.4$) (compound A) or a precursor thereof, a method for manufacturing an electrode active material including the compound represented by General Formula $Li_aA_bD_cPO_4$ (compound A) and the compound represented by General Formula $Li_eC_fPO_4$ (here, C represents at least one selected from Fe and Mn, $0 \le e < 2$, $0 < f < 1.5$, and which is different from the compound represented by General Formula $Li_aA_bD_cPO_4$) which is present on the surface of the compound A (compound B) or a precursor thereof, and the like.

The precursor of the electrode active material is not particularly limited as long as the precursor becomes an electrode active material made of the compound A or an electrode active material including the compound A and the compound B in a final step of a method for manufacturing an electrode material for a lithium ion secondary battery described below.

As a method for manufacturing the compound A, a method of the related art such as a solid phase method, a liquid phase method, or a gas phase method is used.

The method for manufacturing the compound A has, for example, a step of hydrothermally synthesizing a slurry-form mixture prepared by mixing a Li source, an A source, a D source, a P source, and water together using a pressure-resistant airtight container and a step of obtaining an electrode active material made of the compound A or a precursor thereof by cleaning the obtained sediment with water.

In this case, as the Li source, for example, at least one selected from the group consisting of inorganic lithium acid salts such as lithium hydroxide (LiOH), lithium carbonate ($Li_2CO_3$), lithium chloride (LiCl), and lithium phosphate ($Li_3PO_4$) and organic lithium acid salts such as lithium acetate ($LiCH_3COO$) and lithium oxalate (($COOLi)_2$) is preferably used. Among these, lithium chloride and lithium acetate are preferred since a uniform solution phase is easily obtained.

Here, as the A source, at least one selected from the group of a Fe source made of an iron compound, a Mn source made of a manganese compound, a Co source made of a cobalt compound, and a Ni source made of a nickel compound is preferred. In addition, as the D source, at least one selected from the group of a Mg source made of a magnesium compound, a Ca source made of a calcium compound, a Sr source made of a strontium compound, a Ba source made of a barium compound, a Ti source made of a titanium compound, a Zn source made of a zinc compound, a B source made of a boron compound, an Al source made of an aluminum compound, a Ga source made of a gallium compound, an In source made of an indium compound, a Si source made of a silicon compound, a Ge source made of a germanium compound, a Sc source made of a scandium compound, a Y source made of a yttrium compound, and a rare earth element source made of a compound of a rare earth element is preferred.

As the Fe source, for example, a divalent iron compound such as iron (III) chloride ($FeCl_2$), iron (II) sulfate ($FeSO_4$), or iron (III) acetate ($Fe(CH_3COO)_2$) or a hydrate thereof, a trivalent iron compound such as iron (II) nitrate ($Fe(NO_3)_3$), iron (III) chloride ($FeCl_3$), or iron (II) citrate ($FeC_6H_5O_7$), lithium iron phosphate, or the like is used.

As the Mn source, a Mn salt is preferred, and, for example, at least one selected from manganese (II) chloride ($MnCl_2$), manganese (II) sulfate ($MnSO_4$), manganese (II) nitrate ($Mn(NO_3)_3$), manganese (II) acetate ($Mn(CH_3COO)_2$), and hydrates thereof is preferably used. Among these, manganese sulfate is preferred since a uniform solution phase is easily obtained.

As the Co source, a Co salt is preferred, and, for example, at least one selected from cobalt (II) chloride ($CoCl_2$), cobalt (II) sulfate ($CoSO_4$), cobalt (II) nitrate ($Co(NO_3)_2$), cobalt (II) acetate ($Co(CH_3COO)_2$), and hydrates thereof is preferably used.

As the Ni source, a Ni salt is preferred, and, for example, at least one selected from nickel (II) chloride ($NiCl_2$), nickel (II) sulfate ($NiSO_4$), nickel (II) nitrate ($Ni(NO_3)_2$), nickel (II) acetate ($Ni(CH_3COO)_2$), and hydrates thereof is preferably used.

As the Mg source, for example, magnesium (II) chloride ($MgCl_2$), magnesium (II) sulfate ($MgSO_4$), magnesium (II) nitrate ($Mg(NO_3)_2$), magnesium (II) acetate ($Mg(CH_3COO)_2$), and hydrates thereof are exemplified, and at least one selected from the group consisting of the above-described compounds is preferred.

As the Ca source, for example, calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), and hydrates thereof are exemplified, and at least one selected from the group consisting of the above-described compounds is preferred.

As the Sr source, for example, strontium carbonate ($SrCo_3$), strontium sulfate ($SrSO_4$), and strontium hydroxide ($Sr(OH)_2$) are exemplified, and at least one selected from the group consisting of the above-described compounds is preferred.

As the Ba source, for example, barium (II) chloride ($BaCl_2$), barium (II) sulfate ($BaSO_4$), barium (II) nitrate ($Ba(NO_3)_2$), barium (II) acetate ($Ba(CH_3COO)_2$), and hydrates thereof are exemplified, and at least one selected from the group consisting of the above-described compounds is preferred.

As the Ti source, for example, titanium chloride ($TiCl_4$, $TiCl_3$, $TiCl_2$), titanium oxide (TiO), and hydrates thereof are exemplified, and at least one selected from the group consisting of the above-described compounds is preferred.

As the Zn source, a Zn salt is preferred, and for example, zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$), and hydrates thereof are exemplified, and at least one selected from the group consisting of the above-described compounds is preferred.

As the B source, for example, boron compounds such as a chloride, a sulfoxide, a nitroxide, an acetoxide, a hydroxide, and an oxide are exemplified, and at least one selected from the group consisting of the above-described compounds is preferred.

As the Al source, for example, aluminum compounds such as a chloride, a sulfoxide, a nitroxide, an acetoxide, and a hydroxide are exemplified, and at least one selected from the group consisting of the above-described compounds is preferred.

As the Ga source, for example, gallium compounds such as a chloride, a sulfoxide, a nitroxide, an acetoxide, and a hydroxide are exemplified, and at least one selected from the group consisting of the above-described compounds is preferred.

As the In source, for example, indium compounds such as a chloride, a sulfoxide, a nitroxide, an acetoxide, and a hydroxide are exemplified, and at least one selected from the group consisting of the above-described compounds is preferred.

As the Si source, for example, sodium silicate, potassium silicate, silicon tetrachloride ($SiCl_4$), silicate, organic silicon compounds, and the like are exemplified, and at least one selected from the group consisting of the above-described compounds is preferred.

As the Ge source, for example, germanium compounds such as a chloride, a sulfoxide, a nitroxide, an acetoxide, a hydroxide, and an oxide are exemplified, and at least one selected from the group consisting of the above-described compounds is preferred.

As the Sc source, for example, scandium compounds such as a chloride, a sulfoxide, a nitroxide, an acetoxide, a hydroxide, and an oxide are exemplified, and at least one selected from the group consisting of the above-described compounds is preferred.

As the Y source, for example, yttrium compounds such as a chloride, a sulfoxide, a nitroxide, an acetoxide, a hydroxide, and an oxide are exemplified, and at least one selected from the group consisting of the above-described compounds is preferred.

As the rare earth element source, for example, compounds of a rare earth element such as a chloride, a sulfoxide, a nitroxide, an acetoxide, a hydroxide, and an oxide of La, Ce, Pr, Nd, Pm, Sm, Eu, Gd, Tb, Dy, Ho, Er, Tm, Yb, and Lu are exemplified, and at least one selected from the group consisting of the above-described compounds is preferred.

As the P source, for example, at least one selected from phosphoric acid such as orthophosphoric acid ($H_3PO_4$) and metaphosphoric acid ($HPO_3$), ammonium dihydrogen phosphate ($NH_4H_2PO_4$), diammonium hydrogen phosphate (($NH_4)_2HPO_4$), ammonium phosphate (($NH_4)_3PO_4$), lithium phosphate ($Li_3PO_4$), dilithium hydrogen phosphate ($Li_2HPO_4$), lithium dihydrogen phosphate ($LiH_2PO_4$) and hydrate thereof is preferred. Particularly, orthophosphoric acid is preferred since a uniform solution phase is easily formed.

The compound A manufactured using the above-described manufacturing method may be crystalline particles or amorphous particles or may be mixed crystal particles in which crystalline particles and amorphous particles coexist.

Here, the reason that the compound A may be amorphous is that an amorphous compound A crystallizes when, for example, thermally treated in a non-oxidative atmosphere at 500° C. or higher and 1,000° C. or lower in a method for manufacturing the electrode material described below.

In a case in which the electrode active material includes the compound A and the compound B present on the surface thereof, as a method for manufacturing the compound B, a method of the related art such as a solid phase method, a liquid phase method, or a gas phase method is used.

The method for manufacturing the compound B has a step of, for example, calcinating a composite powder obtained by mixing a slurry-form mixture prepared by mixing a Li source, a C source, a P source, and water with the compound A and drying the mixture. Therefore, an electrode active material containing the compound A and the compound B present on the surface thereof or a precursor thereof is obtained.

In this case, as the Li source, for example, at least one selected from the group consisting of lithium inorganic acid salts such as lithium hydroxide (LiOH), lithium carbonate ($Li_2CO_3$), lithium chloride (LiCl), and lithium phosphate ($Li_3PO_4$) and lithium organic acid salts such as lithium acetate ($LiCH_3COO$) and lithium oxalate (($COOLi)_2$) is preferably used. Among these, lithium chloride and lithium acetate are preferred since a uniform solution phase is easily obtained.

Here, as the C source, at least one selected from a group of a Fe source made of an iron compound a Mn source made of a manganese compound is preferred.

As the P source, for example, at least one selected from phosphoric acid such as orthophosphoric acid ($H_3PO_4$) and metaphosphoric acid ($HPO_3$), ammonium dihydrogen phosphate ($NH_4H_2PO_4$), diammonium hydrogen phosphate (($NH_4)_2HPO_4$), ammonium phosphate (($NH_4)_3PO_4$), lithium phosphate ($Li_3PO_4$), dilithium hydrogen phosphate ($Li_2HPO_4$), lithium dihydrogen phosphate ($LiH_2PO_4$) and hydrate thereof is preferred. Particularly, orthophosphoric acid is preferred since a uniform solution phase is easily formed.

The compound B manufactured using the above-described manufacturing method may be crystalline particles or amorphous particles or may be mixed crystal particles in which crystalline particles and amorphous particles coexist.

Here, the reason that the compound B may be amorphous is that an amorphous compound A crystallizes when, for example, thermally treated in a non-oxidative atmosphere at 500° C. or higher and 1,000° C. or lower in a method for manufacturing the electrode material described below.

In addition, in a case in which the electrode active material includes the compound A and the compound B present on the surface thereof, the electrode active material is manufactured as described below.

A slurry-form mixture which includes the compound A or the precursor of the compound A and the compound B or the precursor of the compound B, in a particle size distribution of the compound A and the precursor the compound A, a ratio (D90/D10) of D90 to D10 of the particle size distribution is 5 or more and 30 or less, and, in a particle size distribution of the compound B and the precursor the compound B, a ratio (D90/D10) of D90 to D10 of the particle size distribution is 7 or more and 25 or less is dried (calcinated), thereby obtaining the electrode active material. In addition, in the slurry-form mixture including the compound A and the compound B, the ratio (D90/D10) of D90 to D10 of the particle size distribution of the compound A and the compound B may be adjusted so as to reach 5 or more and 30 or less.

Meanwhile, D10 represents a particle diameter at a cumulative volume percentage of 10% by volume in a volume particle size distribution of the electrode active material, and D90 represents a particle diameter at a cumulative volume percentage of 90% by volume in the volume particle size distribution of the electrode active material.

[Method for Manufacturing an Electrode Material for Lithium Ion Secondary Battery]

A method for manufacturing the electrode material for a lithium ion secondary battery of the present embodiment has, for example, a step of preparing a slurry including the electrode active material or the precursor of the electrode active material obtained using the above-described method for manufacturing an electrode active material or a precursor of the electrode active material and a precursor of the carbonaceous film (hereinafter, referred to as "carbon precursor") (hereinafter, referred to as the "slurry preparation step"), a step of producing a granulated body by spraying and drying the slurry (hereinafter, referred to as the "granulated body production step"), and a step of thermally treatment the granulated body in a non-oxidative atmosphere at 500° C. or higher and 1,000° C. or lower (hereinafter, referred to as the "thermal treatment step").

Hereinafter, the method for manufacturing the electrode material of the present embodiment will be described in detail.

"Slurry Preparation Step"

In the slurry preparation step, the compound A or the compound A and the compound B and the carbon precursor are dissolved or dispersed in water, thereby preparing a homogeneous slurry. Here, in order to simply the description, the compound A or the precursor of the compound A will be referred to as the "compound A", and the compound B or the precursor of the compound B will be referred to as the "compound B".

In the slurry preparation step, when the compound A or the compound A and the compound B and the carbon precursor are dissolved or dispersed in water, a dispersant is preferably added thereto.

In the slurry preparation step, a method for dissolving or dispersing the compound A or the compound A and the compound B and the carbon precursor in water is not particularly limited as long as the compound A or the compound A and the compound B are dispersed in water, and the carbon precursor is dissolved or dispersed in water. As the above-described method, a method in which a medium stirring-type dispersion device that stirs medium particles at a high rate such as a planetary ball mill, an oscillation ball mill, a bead mill, a paint shaker, or an attritor is used is preferably used.

In the slurry preparation step, when the compound A or the compound A and the compound B and the carbon precursor are dissolved or dispersed in water, it is preferable to dispersion primary particles of the compound A or primary particles of the compound A and the compound B in water and then dissolving the carbon precursor in the water including the compound A or the compound A and the compound B. In such a case, the surfaces of the primary particles of the compound A or the primary particles of the compound A and the compound B are coated with the carbon precursor, and consequently, carbon derived from the carbon precursor is uniformly interposed among the primary particles of the compound A or the primary particles of the compound A and the compound B.

In addition, in the slurry preparation step, it is preferable to appropriately adjust dispersion conditions of the slurry, for example, concentrations of the compound A or the compound A and the compound B in the slurry, a concentration of an organic compound in the slurry, and a stirring time of the slurry so that a ratio (D90/D10) of D90 to D10 of a particle size distribution of the compound A or the compound A and the compound B in the slurry reaches 5 or more and 30 or less in the particle size distribution.

Examples of the carbon precursor include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, polyvalent alcohols, and the like.

In the electrode material of the present embodiment, in a case in which the electrode active material is the compound A alone, a blending ratio between the compound A and the carbon precursor needs to be adjusted in consideration of a proportion of the carbon precursor remaining as carbon after a thermal treatment, and an amount of carbon after the thermal treatment is preferably 0.8 parts by mass or more and 3.5 parts by mass or less and more preferably 1.1 parts by mass or more and 1.7 parts by mass or less with respect to 100 parts by mass of the compound A.

In addition, in the electrode material of the present embodiment, in a case in which the electrode active material includes the compound A and the compound B, a blending ratio between the compound A and the compound B and the carbon precursor needs to be adjusted in consideration of a proportion of the carbon precursor remaining as carbon after a thermal treatment, and an amount of carbon after the thermal treatment is preferably 0.8 parts by mass or more and 3.5 parts by mass or less and more preferably 1.1 parts by mass or more and 1.7 parts by mass or less with respect to 100 parts by mass of a total amount of the compound A and the compound B.

In the electrode material of the present embodiment, when the blending ratio in the case of converting a total amount of the carbon precursor to the amount of carbon is 0.8 parts by mass or more, the coating ratio of the carbonaceous film formed on the surface of the electrode active material exceeds 40%, and thus, in the case of forming a lithium ion secondary battery, the discharge capacity of the lithium ion secondary battery at a high charge-discharge rate increases. As a result, it is possible to realize a sufficient charge and discharge rate performance in the lithium ion secondary battery. Meanwhile, when the blending ratio in the case of converting a total amount of the carbon precursor to the amount of carbon is 3.5 parts by mass or less, an average value of a thickness of the carbonaceous film in the electrode material reaches 7 nm or less, and there are no cases in which the charge migration resistance caused by a steric barrier increases during the diffusion of lithium ions in the carbonaceous film. As a result, there are no cases in which an internal resistance of the lithium ion secondary battery increases, and voltage drop at a high charge-discharge rate of the lithium ion secondary battery does not easily occur.

"Granulated Body Production Step"

In the granulated body production step, the slurry obtained in the slurry preparation step is sprayed and dried in a high-temperature atmosphere, for example, in the atmosphere at 70° C. or higher and 250° C. or lower, thereby producing a granulated body.

In the granulated body production step, a particle size distribution of primary particles included in an electrode material to be obtained can be controlled by appropriately adjusting conditions for drying the slurry, for example, a concentration of the slurry, amounts of gas and liquid (an amount of the slurry and an amount of a gas that is used to spray the slurry), a nozzle shape, and a drying temperature.

Meanwhile, the obtained granulated body may be crushed before and after the thermal treatment step described below. A method for crushing the granulated body is not particularly limited, and, for example, a method in which an air flow-type crusher is used is preferably used.

"Thermal Treatment Step"

In the thermal treatment step, the granulated body obtained in the granulated body production step is calcinated in a mixed atmosphere of a non-oxidative gas and an oxidant and preferably at 500° C. or higher and 1,000° C. or lower, thereby obtaining an agglomerate of the electrode active material coated with the carbonaceous film (hereinafter, referred to as the "carbon coated electrode active material agglomerate").

A calcination temperature is more preferably 600° C. or higher and 900° C. or lower.

In addition, in the thermal treatment step, the granulated body obtained in the granulated body production step is preferably calcinated in the above-described temperature range for 0.1 hours or longer and 40 hours or shorter.

When the calcination temperature is 500° C. or higher, the decomposition reaction of the carbon precursor included in the granulated body does not sufficiently proceed, the carbonization of the carbon precursor becomes insufficient. As a result, a high-resistance organic substance decomposed substance is not generated in the obtained carbon coated electrode active material agglomerate. Meanwhile, when the calcination temperature is 1,000° C. or lower, there are no cases in which lithium in the compound A or the compound A and the compound B evaporate, and thus the composition of the electrode active material does not change, and furthermore, the grain growth of the electrode active material is not accelerated. As a result, the discharge capacity of the lithium ion secondary battery at a high charge-discharge rate increases, and it is possible to realize a sufficient charge and discharge rate performance in the lithium ion secondary battery.

As the mixed atmosphere of a non-oxidative gas and an oxidant, a mixed atmosphere of an inert gas such as nitrogen ($N_2$) or argon (Ar) and nitric acid gas ($HNO_3$), a mixed atmosphere of an inert gas and nitrogen monoxide (NO), a mixed atmosphere of an inert gas and ozone ($O_3$), a mixed atmosphere of an inert gas and sulfuric acid gas ($H_2SO_4$), a mixed atmosphere of an inert gas and nitrogen dioxide ($NO_2$), or the like is preferably used. When the oxidant is introduced to the non-oxidative gas, it is possible to oxide, for example, a hydroxy group to a carboxyl group. While a hydroxy group has one polar group, a carboxyl group has two polar groups. Therefore, when a carboxyl group is introduced to the outermost surface of the carbonaceous film which faces the electrode active material due to the oxidation of a hydroxy group using the oxidant, a force of the carbonaceous film on the surface of the electrode active material attracting water molecules and hydrogen fluoride in the electrolyte becomes strong when assembled as a battery. As a result, the contact frequency between hydrogen fluoride and the electrode active material decreases, and the battery service life of the lithium ion secondary battery improves. In addition, from a functional group on the surface of the carbonaceous film which is generated in the case of mixing the oxidant such as a nitrogen oxide, ozone, a sulfuric acid gas, or nitrogen dioxide, the same effect is also anticipated.

A number of the carbon precursors include a hydroxy group. When the carbon precursors are heated in a non-oxidative atmosphere, the carbon precursors decompose, cyclize, aromatize, and polycondense, and thus progressively carbonize stepwise. In this carbonization process, the hydroxy groups volatilize as a volatile component (low-molecular-weight paraffin, low-molecular-weight olefin, or low-molecular-weight aromatic group), but some of the hydroxy groups remain and form a part of the carbonaceous film. When a heating temperature exceeds 1,100° C. to 1,900° C., the carbonization is completed; however, as the heating temperature becomes lower, a remaining ratio of the hydroxy groups increases. Meanwhile, in a case in which the carbon precursor does not include a nitro group and a sulfo group respectively, a nitro group and a sulfo group are not introduced to the carbonaceous film. When nitrogen, a nitrogen-containing gas, sulfuric acid, a sulfur-containing gas, or the like are added to the atmosphere gas, nitrogen and sulfur enter the carbonaceous film as a nitro group and a sulfo group in the carbonization process of the carbon precursor.

In the thermal treatment step, a particle size distribution of primary particles included in a carbonaceous coated electrode active material agglomerate to be obtained can be controlled by appropriately adjusting conditions for calcinating the granulated body, for example, a temperature-increase rate, a highest holding temperature, a holding time of the highest holding temperature, and the like.

A green compact density of the electrode material of the present embodiment obtained as described above, which is a pellet density under the application of a pressure of 51 MPa is preferably 2.3 g/cm$^3$ or less, more preferably 2.2 g/cm$^3$ or less, and still more preferably 2.1 g/cm$^3$ or less.

When the green compact density is 2.3 g/cm$^3$ or less, in the pressurization of the electrode mixture layer, the number of contact points of the conductive auxiliary agent in the electrode mixture layer becomes sufficient without causing the collapse of pores present in the electrode material granulated body, in the case of forming a lithium ion secondary battery, the discharge capacity of the lithium ion secondary battery at a high charge-discharge rate increases. As a result, a sufficient charge and discharge rate performance of the lithium ion secondary battery can be realized.

Meanwhile, the green compact density can be measured using a powder resistance measurement system (for example, trade name: MCP-PD51 type, manufactured by Mitsubishi Chemical Analytech Co., Ltd.).

[Electrode for a Lithium Ion Secondary Battery]

An electrode for a lithium ion secondary battery of the present embodiment (hereinafter, also abbreviated as the "electrode") is an electrode for a lithium ion secondary battery including an electrode current collector and an electrode mixture layer (electrode) formed on the electrode current collector, in which the electrode mixture layer contains the electrode material granulated body for a lithium ion secondary battery of the present embodiment. That is, the electrode of the present embodiment is an electrode obtained by forming the electrode mixture layer on one main surface of the electrode current collector using the electrode material granulated body of the present embodiment.

A method for manufacturing the electrode of the present embodiment is not particularly limited as long as the electrode mixture layer can be formed on one main surface of the electrode current collector using the electrode material granulated body of the present embodiment. As the method for manufacturing the electrode of the present embodiment, for example, the following method is exemplified.

First, an electrode material mixture is prepared by mixing the electrode material granulated body of the present embodiment, a binder resin (binding agent), and a solvent. At this time, to the electrode material mixture in the present embodiment, a conductive auxiliary agent such as carbon black may be added as necessary.

"Binder Resin"

Examples of the binder resin, that is, the binding agent include polyvinylidene fluoride (PVdF), polyethylene, polypropylene, polyethylene terephthalate, polymethyl methacrylate, vinyl acetate copolymers, styrene•butadiene-based latex, acrylic latex, acrylonitrile•butadiene-based latex, fluorine-based latex, silicone-based latex, and the like. The binder resins may be used singly or two or more binder resins may be used in mixture.

A content of the binder resin in the electrode material mixture is preferably 2% by mass or more and 10% by mass or less and more preferably 4% by mass or more and 8% by mass or less in a case in which a total mass of the electrode material granulated body of the present embodiment, the binder resin, and the conductive auxiliary agent is set to 100% by mass.

When the content of the binder resin is 2% by mass or more, in the case of forming the electrode mixture layer using the electrode material mixture including the electrode material granulated body of the present embodiment, the binding property between the electrode mixture layer and the electrode current collector becomes sufficient, and there are no cases in which the electrode mixture layer cracks or drops during the formation of the electrode mixture layer by rolling. In addition, in a charging and discharging process of the lithium ion secondary battery, the electrode mixture layer does not peel off from the electrode current collector, and there are no cases in which the battery capacity or the charge and discharge rate of the lithium ion secondary battery decreases. Meanwhile, when the content of the binder resin is 10% by mass or less, the internal resistance of the electrode material granulated body does not increase, and there are no cases in which the battery capacity of the lithium ion secondary battery at a high charge-discharge rate decreases.

"Conductive Auxiliary Agent"

The conductive auxiliary agent is not particularly limited, and examples thereof include particulate carbon such as acetylene black (AB), ketjen black, and furnace black, fibrous carbon such as vapor grown carbon fiber (VGCF) and carbon nanotube, and the like. The conductive auxiliary agents may be used singly or two or more conductive auxiliary agents may be used in mixture.

A content of the conductive auxiliary agent in the electrode material mixture is preferably 2% by mass or more and 10% by mass or less and more preferably 4% by mass or more and 8% by mass or less in a case in which the total mass of the electrode material granulated body of the present embodiment, the binder resin, and the conductive auxiliary agent is set to 100% by mass.

When the content of the conductive auxiliary agent is 2% by mass or more, in the case of forming the electrode mixture layer using the electrode material mixture including the electrode material granulated body of the present embodiment, the electron conductivity of the electrode mixture layer becomes sufficient, and the battery capacity or the charge and discharge rate of the lithium ion secondary battery improves. Meanwhile, when the content of the conductive auxiliary agent is 10% by mass or less, a proportion of the electrode material granulated body in the electrode mixture layer relatively increases, and the battery capacity of the lithium ion secondary battery per unit volume improves.

"Solvent"

The solvent that is used in the electrode material mixture including the electrode material granulated body of the present embodiment is appropriately selected depending on the properties of the binder resin. When the solvent is appropriately selected, it is possible to facilitate the application of the electrode material mixture to substances to be coated such as the electrode current collector.

Examples of the solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidone (NMP), glycols such as ethylene glycol, diethylene glycol, and propylene glycol, and the like. These solvents may be used singly or in a mixture form of two or more solvents.

A content of the solvent in the electrode material mixture is preferably 50% by mass or more and 70% by mass or less and more preferably 55% by mass or more and 65% by mass or less in a case in which a total mass of the electrode material granulated body of the present embodiment, the binder resin, and the solvent is set to 100% by mass. When the content of the solvent in the electrode material mixture is in the above-described range, it is possible to obtain an electrode material mixture which has an excellent electrode-forming property and excellent battery characteristics.

A method for mixing the electrode material granulated body of the present embodiment, the binder resin, the conductive auxiliary agent, and the solvent is not particularly limited as long as these components can be uniformly mixed together. Examples thereof include mixing methods in which a kneader such as a ball mill, a sand mill, a planetary (sun-and-planet-type) mixer, a paint shaker, or a homogenizer is used.

Next, the electrode material mixture is applied onto one main surface of the electrode current collector to form a coated film, and then this coated film is dried and bonded by pressurization, whereby an electrode for a lithium ion secondary battery in which the electrode mixture layer is formed on one main surface of the electrode current collector can be obtained.

According to the electrode for a lithium ion secondary battery of the present embodiment, the electrode material granulated body of the present embodiment is contained, and a lithium ion secondary battery in which the electrode for a lithium ion secondary battery of the present embodiment is used has excellent input and output characteristics and excellent charge and discharge rate performance at room temperature.

[Lithium Ion Secondary Battery]

A lithium ion secondary battery of the present embodiment includes a cathode, an anode, and a non-aqueous electrolyte (electrolyte), and the cathode is the electrode for a lithium ion secondary battery of the present embodiment. Specifically, the lithium ion secondary battery of the present embodiment includes the electrode for a lithium ion secondary battery of the present embodiment as a cathode, an anode, a separator, and a non-aqueous electrolyte.

In the lithium ion secondary battery of the present embodiment, the anode, the non-aqueous electrolyte, the separator, and the like are not particularly limited.

Examples of the anode include anodes including metallic Li, a carbon material such as natural graphite or hard carbon, a Li alloy, or an anode material such as $Li_4Ti_5O_{12}$ or $Si(Li_{4.4}Si)$.

"Non-Aqueous Electrolyte"

Examples of the non-aqueous electrolyte include non-aqueous electrolytes obtained by mixing ethylene carbonate (EC) and ethyl methyl carbonate (EMC) so that a volume ratio reaches 0 to 1:1 and dissolving lithium hexafluorophosphate ($LiPF_6$) in the obtained solvent mixture so that a concentration reaches 1 mol/dm$^3$.

"Separator"

As the separator, for example, porous propylene can be used. In addition, instead of the non-aqueous electrolyte and the separator, a solid electrolyte may be used.

In the lithium ion secondary battery of the present embodiment, the electrode for a lithium ion secondary battery of the present embodiment is provided as a cathode, and thus high-speed charge and discharge becomes possible.

EXAMPLES

Hereinafter, the present invention will be more specifically described using examples and comparative examples, but the present invention is not limited to the following examples.

27

Example 1

(1) Synthesis of Electrode Material for Lithium Ion Secondary Battery

Lithium hydroxide (LiOH) (6 mol), iron (II) acetate ($Fe(CH_3COO)_2$) (2 mol), phosphoric acid ($H_3PO_4$) (2 mol), and lithium sulfate ($Li_2SO_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 130° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (15 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained (slurry preparation step).

Next, the obtained slurry was sprayed and dried in the atmosphere at 200° C., thereby obtaining a dried substance (granulated body production step).

Next, the obtained dried substance was calcinated in a nitrogen atmosphere including 0.1% by volume of $HNO_3$ for one hour at 600° C., thereby obtaining an electrode material granulated body having an average secondary particle diameter of 10 μm (thermal treatment step).

(2) Production of Electrode Material for Lithium Ion Secondary Battery

The electrode material granulated body, polyvinylidene fluoride (PVdF) as a binder resin, and acetylene black (AB) as a conductive auxiliary agent were mixed together so that a mass ratio reached 90:5:5, and furthermore, N-methyl-2-pyrrolidone (NMP) was added thereto as a solvent to impart fluidity, thereby preparing an electrode material mixture.

Next, this electrode material mixture was applied and dried on a surface of a 15 μm-thick aluminum foil (electrode current collector) at a weight per unit area of 8 mg/cm² as a mass of the electrode material, thereby forming a coated film.

After that, this coated film was pressurized at a linear pressure of 7 tons/250 mm, thereby producing an electrode for a lithium ion secondary battery of Example 1.

(3) Production of Lithium Ion Secondary Battery

As a counter electrode, a natural graphite anode was disposed so as to face the electrode for a lithium ion secondary battery, and a separator made of porous polypropylene was disposed between the electrode for a lithium ion secondary battery and the counter electrode, thereby producing a member for a battery.

Meanwhile, ethylene carbonate and diethylene carbonate were mixed together, and furthermore, 1 mol/L of a $LiPF_6$ solution was added thereto, thereby preparing an electrolyte solution. Meanwhile, adjustment was made in consideration of an amount of ethylene carbonate included in the electrode material so that a volume ratio between ethylene carbonate and diethylene carbonate in a battery reached 1:1, and furthermore, 1 mol/L of a $LiPF_6$ solution was added thereto, thereby preparing an electrolyte solution having a lithium ion conductivity.

Next, the member for a battery was immersed in the electrolyte solution, thereby producing a lithium ion secondary battery of Example 1.

Example 2

Lithium hydroxide (LiOH) (6 mol), iron (II) acetate ($Fe(CH_3COO)_2$) (2 mol), phosphoric acid ($H_3PO_4$) (2 mol), and lithium sulfate ($Li_2SO_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 130° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (13.2 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance (granulated body production step).

Next, the obtained dried substance was calcinated in a nitrogen atmosphere including 0.5% by volume of $HNO_3$ for one hour at 600° C., and a granulated body having an average secondary particle diameter of 10 μm was obtained and considered as an electrode material for a lithium ion secondary battery of Example 2.

An electrode for a lithium ion secondary battery of Example 2 was produced in the same manner as in Example 1 except for the fact that the electrode material for a lithium ion secondary battery of Example 2 was used.

A lithium ion secondary battery of Example 2 was produced in the same manner as in Example 1 except for the fact that the electrode for a lithium ion secondary battery of Example 2 was used.

Example 3

Lithium hydroxide (LiOH) (6 mol), iron (II) acetate ($Fe(CH_3COO)_2$) (2 mol), phosphoric acid ($H_3PO_4$) (2 mol), and lithium sulfate ($Li_2SO_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 130° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (11.4 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 2.5% by volume of $HNO_3$ for one hour at 600° C., and a granulated body having an average secondary particle diameter of 10 μm was obtained and considered as an electrode material for a lithium ion secondary battery of Example 3.

An electrode for a lithium ion secondary battery of Example 3 was produced in the same manner as in Example 1 except for the fact that the electrode material for a lithium ion secondary battery of Example 3 was used.

A lithium ion secondary battery of Example 3 was produced in the same manner as in Example 1 except for the fact that the electrode for a lithium ion secondary battery of Example 3 was used.

Example 4

Lithium hydroxide (LiOH) (6 mol), iron (II) acetate ($Fe(CH_3COO)_2$) (2 mol), phosphoric acid ($H_3PO_4$) (2 mol), and lithium sulfate ($Li_2SO_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 130° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (9.0 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 5.0% by volume of $HNO_3$ for one hour at 600° C., and a granulated body having an average secondary particle diameter of 10 μm was obtained and considered as an electrode material for a lithium ion secondary battery of Example 4.

An electrode for a lithium ion secondary battery of Example 4 was produced in the same manner as in Example 1 except for the fact that the electrode material for a lithium ion secondary battery of Example 4 was used.

A lithium ion secondary battery of Example 4 was produced in the same manner as in Example 1 except for the fact that the electrode for a lithium ion secondary battery of Example 4 was used.

Example 5

Lithium hydroxide (LiOH) (6 mol), iron (II) acetate ($Fe(CH_3COO)_2$) (2 mol), phosphoric acid ($H_3PO_4$) (2 mol), and lithium sulfate ($Li_2SO_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 130° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (12.6 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.1% by volume of NO for one hour at 700° C., and a granulated body having an average secondary particle diameter of 10 μm was obtained and considered as an electrode material for a lithium ion secondary battery of Example 5.

An electrode for a lithium ion secondary battery of Example 5 was produced in the same manner as in Example 1 except for the fact that the electrode material for a lithium ion secondary battery of Example 5 was used.

A lithium ion secondary battery of Example 5 was produced in the same manner as in Example 1 except for the fact that the electrode for a lithium ion secondary battery of Example 5 was used.

Example 6

Lithium hydroxide (LiOH) (6 mol), iron (II) acetate ($Fe(CH_3COO)_2$) (2 mol), phosphoric acid ($H_3PO_4$) (2 mol), and lithium sulfate ($Li_2SO_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 220° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (4.8 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.5% by volume of NO for one hour at 700° C., and a granulated body having an average secondary particle diameter of 25 μm was obtained and considered as an electrode material for a lithium ion secondary battery of Example 6.

An electrode for a lithium ion secondary battery of Example 6 was produced in the same manner as in Example 1 except for the fact that the electrode material for a lithium ion secondary battery of Example 6 was used.

A lithium ion secondary battery of Example 6 was produced in the same manner as in Example 1 except for the fact that the electrode for a lithium ion secondary battery of Example 6 was used.

Example 7

Lithium hydroxide (LiOH) (6 mol), iron (II) acetate $(Fe(CH_3COO)_2)$ (2 mol), phosphoric acid $(H_3PO_4)$ (2 mol), and lithium sulfate $(Li_2SO_4)$ (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 280° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (4.8 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 2.5% by volume of NO for one hour at 700° C., and a granulated body having an average secondary particle diameter of 35 μm was obtained and considered as an electrode material for a lithium ion secondary battery of Example 7.

An electrode for a lithium ion secondary battery of Example 7 was produced in the same manner as in Example 1 except for the fact that the electrode material for a lithium ion secondary battery of Example 7 was used.

A lithium ion secondary battery of Example 7 was produced in the same manner as in Example 1 except for the fact that the electrode for a lithium ion secondary battery of Example 7 was used.

Example 8

Lithium hydroxide (LiOH) (6 mol), iron (II) acetate $(Fe(CH_3COO)_2)$ (2 mol), phosphoric acid $(H_3PO_4)$ (2 mol), and lithium sulfate $(Li_2SO_4)$ (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 120° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (4.8 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 5.0% by volume of NO for one hour at 700° C., and a granulated body having an average secondary particle diameter of 0.3 μm was obtained and considered as an electrode material for a lithium ion secondary battery of Example 8.

An electrode for a lithium ion secondary battery of Example 8 was produced in the same manner as in Example 1 except for the fact that the electrode material for a lithium ion secondary battery of Example 8 was used.

A lithium ion secondary battery of Example 8 was produced in the same manner as in Example 1 except for the fact that the electrode for a lithium ion secondary battery of Example 8 was used.

Example 9

Lithium hydroxide (LiOH) (6 mol), iron (II) acetate $(Fe(CH_3COO)_2)$ (2 mol), phosphoric acid $(H_3PO_4)$ (2 mol), and lithium sulfate $(Li_2SO_4)$ (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 170° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (10.8 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.1% by volume of $O_3$ for one hour at 800° C., and a granulated body having an average secondary particle diameter of 14 μm was obtained and considered as an electrode material for a lithium ion secondary battery of Example 9.

An electrode for a lithium ion secondary battery of Example 9 was produced in the same manner as in Example 1 except for the fact that the electrode material for a lithium ion secondary battery of Example 9 was used.

A lithium ion secondary battery of Example 9 was produced in the same manner as in Example 1 except for the fact that the electrode for a lithium ion secondary battery of Example 9 was used.

Example 10

Lithium hydroxide (LiOH) (6 mol), iron (II) acetate (Fe(CH$_3$COO)$_2$) (2 mol), phosphoric acid (H$_3$PO$_4$) (2 mol), and lithium sulfate (Li$_2$SO$_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 170° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (9.6 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.5% by volume of O$_3$ for one hour at 800° C., and a granulated body having an average secondary particle diameter of 14 μm was obtained and considered as an electrode material for a lithium ion secondary battery of Example 10.

An electrode for a lithium ion secondary battery of Example 10 was produced in the same manner as in Example 1 except for the fact that the electrode material for a lithium ion secondary battery of Example 10 was used.

A lithium ion secondary battery of Example 10 was produced in the same manner as in Example 1 except for the fact that the electrode for a lithium ion secondary battery of Example 10 was used.

Example 11

Lithium hydroxide (LiOH) (6 mol), iron (II) acetate (Fe(CH$_3$COO)$_2$) (2 mol), phosphoric acid (H$_3$PO$_4$) (2 mol), and lithium sulfate (Li$_2$SO$_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 170° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (8.4 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 2.5% by volume of O$_3$ for one hour at 800° C., and a granulated body having an average secondary particle diameter of 14 μm was obtained and considered as an electrode material for a lithium ion secondary battery of Example 11.

An electrode for a lithium ion secondary battery of Example 11 was produced in the same manner as in Example 1 except for the fact that the electrode material for a lithium ion secondary battery of Example 11 was used.

A lithium ion secondary battery of Example 11 was produced in the same manner as in Example 1 except for the fact that the electrode for a lithium ion secondary battery of Example 11 was used.

Example 12

Lithium hydroxide (LiOH) (6 mol), iron (II) acetate (Fe(CH$_3$COO)$_2$) (2 mol), phosphoric acid (H$_3$PO$_4$) (2 mol), and lithium sulfate (Li$_2$SO$_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 170° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (7.2 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 5.0% by volume of O$_3$ for one hour at 800° C., and a granulated body having an average secondary particle diameter of 14 μm was obtained and considered as an electrode material for a lithium ion secondary battery of Example 12.

An electrode for a lithium ion secondary battery of Example 12 was produced in the same manner as in Example 1 except for the fact that the electrode material for a lithium ion secondary battery of Example 12 was used.

A lithium ion secondary battery of Example 12 was produced in the same manner as in Example 1 except for the fact that the electrode for a lithium ion secondary battery of Example 12 was used.

Example 13

Lithium hydroxide (LiOH) (6 mol), iron (II) acetate (Fe(CH$_3$COO)$_2$) (0.53 mol), cobalt (II) acetate (Co(CH$_3$COO)$_2$) (0.01 mol), magnesium acetate (Mg(CH$_3$COO)$_2$) (0.06 mol), manganese (II) acetate (Mn(CH$_3$COO)$_2$) (1.4 mol), phosphoric acid (H$_3$PO$_4$) (2 mol), and lithium sulfate (Li$_2$SO$_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 110° C. for one hour, thereby generating a sediment.

Next, the obtained sediment was cleaned with water, thereby obtaining a cake-form electrode active material.

Next, lithium hydroxide (LiOH) (0.1 mol), iron (II) acetate (Fe(CH$_3$COO)$_2$) (0.1 mol), phosphoric acid (H$_3$PO$_4$) (0.1 mol), and lithium sulfate (Li$_2$SO$_4$) (1.92×10$^{-5}$ mol) were added to this cake-form electrode active material, the components were mixed together so that a total amount reached 2 L and then dried, LiFePO$_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (11.4 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.1% by volume of HNO$_3$ for one hour at 600° C., and a granulated body having an average secondary particle diameter of 20 μm was obtained and considered as an electrode material for a lithium ion secondary battery of Example 13.

An electrode for a lithium ion secondary battery of Example 13 was produced in the same manner as in Example 1 except for the fact that the electrode material for a lithium ion secondary battery of Example 13 was used.

A lithium ion secondary battery of Example 13 was produced in the same manner as in Example 1 except for the fact that the electrode for a lithium ion secondary battery of Example 13 was used.

Example 14

Lithium hydroxide (LiOH) (6 mol), iron (II) acetate (Fe(CH$_3$COO)$_2$) (0.53 mol), cobalt (II) acetate (Co(CH$_3$COO)$_2$) (0.01 mol), magnesium acetate (Mg(CH$_3$COO)$_2$) (0.06 mol), manganese (II) acetate (Mn(CH$_3$COO)$_2$) (1.4 mol), phosphoric acid (H$_3$PO$_4$) (2 mol), and lithium sulfate (Li$_2$SO$_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 110° C. for one hour, thereby generating a sediment.

Next, the obtained sediment was cleaned with water, thereby obtaining a cake-form electrode active material.

Next, lithium hydroxide (LiOH) (0.1 mol), iron (II) acetate (Fe(CH$_3$COO)$_2$) (0.1 mol), phosphoric acid (H$_3$PO$_4$) (0.1 mol), and lithium sulfate (Li$_2$SO$_4$) (1.92×10$^{-5}$ mol) were added to this cake-form electrode active material, the components were mixed together so that a total amount reached 2 L and then dried, LiFePO$_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (9.6 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.5% by volume of HNO$_3$ for one hour at 600° C., and a granulated body having an average secondary particle diameter of 20 μm was obtained and considered as an electrode material for a lithium ion secondary battery of Example 14.

An electrode for a lithium ion secondary battery of Example 14 was produced in the same manner as in Example 1 except for the fact that the electrode material for a lithium ion secondary battery of Example 14 was used.

A lithium ion secondary battery of Example 14 was produced in the same manner as in Example 1 except for the fact that the electrode for a lithium ion secondary battery of Example 14 was used.

Example 15

Lithium hydroxide (LiOH) (6 mol), iron (II) acetate (Fe(CH$_3$COO)$_2$) (0.53 mol), cobalt (II) acetate (Co(CH$_3$COO)$_2$) (0.01 mol), magnesium acetate (Mg(CH$_3$COO)$_2$) (0.06 mol), manganese (II) acetate (Mn(CH$_3$COO)$_2$) (1.4 mol), phosphoric acid (H$_3$PO$_4$) (2 mol), and lithium sulfate (Li$_2$SO$_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 110° C. for one hour, thereby generating a sediment.

Next, the obtained sediment was cleaned with water, thereby obtaining a cake-form electrode active material.

Next, lithium hydroxide (LiOH) (0.1 mol), iron (II) acetate (Fe(CH$_3$COO)$_2$) (0.1 mol), phosphoric acid (H$_3$PO$_4$) (0.1 mol), and lithium sulfate (Li$_2$SO$_4$) (1.92×10$^{-5}$ mol) were added to this cake-form electrode active material, the components were mixed together so that a total amount reached 2 L and then dried, LiFePO$_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (7.8 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 2.5% by volume of $HNO_3$ for one hour at 600° C., and a granulated body having an average secondary particle diameter of 20 µm was obtained and considered as an electrode material for a lithium ion secondary battery of Example 15.

An electrode for a lithium ion secondary battery of Example 15 was produced in the same manner as in Example 1 except for the fact that the electrode material for a lithium ion secondary battery of Example 15 was used.

A lithium ion secondary battery of Example 15 was produced in the same manner as in Example 1 except for the fact that the electrode for a lithium ion secondary battery of Example 15 was used.

Example 16

Lithium hydroxide (LiOH) (6 mol), iron (II) acetate ($Fe(CH_3COO)_2$) (0.53 mol), cobalt (II) acetate (Co $(CH_3COO)_2$) (0.01 mol), magnesium acetate (Mg $(CH_3COO)_2$) (0.06 mol), manganese (II) acetate (Mn $(CH_3COO)_2$) (1.4 mol), phosphoric acid ($H_3PO_4$) (2 mol), and lithium sulfate ($Li_2SO_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 110° C. for one hour, thereby generating a sediment.

Next, the obtained sediment was cleaned with water, thereby obtaining a cake-form electrode active material.

Next, lithium hydroxide (LiOH) (0.1 mol), iron (II) acetate ($Fe(CH_3COO)_2$) (0.1 mol), phosphoric acid ($H_3PO_4$) (0.1 mol), and lithium sulfate ($Li_2SO_4$) ($1.92 \times 10^{-5}$ mol) were added to this cake-form electrode active material, the components were mixed together so that a total amount reached 2 L and then dried, $LiFePO_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (6.0 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 5.0% by volume of $HNO_3$ for one hour at 600° C., and a granulated body having an average secondary particle diameter of 20 µm was obtained and considered as an electrode material for a lithium ion secondary battery of Example 16.

An electrode for a lithium ion secondary battery of Example 16 was produced in the same manner as in Example 1 except for the fact that the electrode material for a lithium ion secondary battery of Example 16 was used.

A lithium ion secondary battery of Example 16 was produced in the same manner as in Example 1 except for the fact that the electrode for a lithium ion secondary battery of Example 16 was used.

Example 17

Lithium hydroxide (LiOH) (6 mol), iron (II) acetate ($Fe(CH_3COO)_2$) (0.53 mol), cobalt (II) acetate (Co $(CH_3COO)_2$) (0.01 mol), magnesium acetate (Mg $(CH_3COO)_2$) (0.06 mol), manganese (II) acetate (Mn $(CH_3COO)_2$) (1.4 mol), phosphoric acid ($H_3PO_4$) (2 mol), and lithium sulfate ($Li_2SO_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 120° C. for one hour, thereby generating a sediment.

Next, the obtained sediment was cleaned with water, thereby obtaining a cake-form electrode active material.

Next, lithium hydroxide (LiOH) (0.1 mol), iron (II) acetate ($Fe(CH_3COO)_2$) (0.1 mol), phosphoric acid ($H_3PO_4$) (0.1 mol), and lithium sulfate ($Li_2SO_4$) ($1.92 \times 10^{-5}$ mol) were added to this cake-form electrode active material, the components were mixed together so that a total amount reached 2 L and then dried, $LiFePO_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (15.0 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.1% by volume of NO for one hour at 700° C., and a granulated body having an average secondary particle diameter of 20 µm was obtained and considered as an electrode material for a lithium ion secondary battery of Example 17.

An electrode for a lithium ion secondary battery of Example 17 was produced in the same manner as in Example 1 except for the fact that the electrode material for a lithium ion secondary battery of Example 17 was used.

A lithium ion secondary battery of Example 17 was produced in the same manner as in Example 1 except for the fact that the electrode for a lithium ion secondary battery of Example 17 was used.

Example 18

Lithium hydroxide (LiOH) (6 mol), iron (II) acetate ($Fe(CH_3COO)_2$) (0.53 mol), cobalt (II) acetate (Co $(CH_3COO)_2$) (0.01 mol), magnesium acetate (Mg $(CH_3COO)_2$) (0.06 mol), manganese (II) acetate (Mn $(CH_3COO)_2$) (1.4 mol), phosphoric acid ($H_3PO_4$) (2 mol), and lithium sulfate ($Li_2SO_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 120° C. for one hour, thereby generating a sediment.

Next, the obtained sediment was cleaned with water, thereby obtaining a cake-form electrode active material.

Next, lithium hydroxide (LiOH) (0.1 mol), iron (II) acetate (Fe(CH$_3$COO)$_2$) (0.1 mol), phosphoric acid (H$_3$PO$_4$) (0.1 mol), and lithium sulfate (Li$_2$SO$_4$) (1.92×10$^{-5}$ mol) were added to this cake-form electrode active material, the components were mixed together so that a total amount reached 2 L and then dried, LiFePO$_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (9.6 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.5% by volume of NO for one hour at 700° C., and a granulated body having an average secondary particle diameter of 20 μm was obtained and considered as an electrode material for a lithium ion secondary battery of Example 18.

An electrode for a lithium ion secondary battery of Example 18 was produced in the same manner as in Example 1 except for the fact that the electrode material for a lithium ion secondary battery of Example 18 was used.

A lithium ion secondary battery of Example 18 was produced in the same manner as in Example 1 except for the fact that the electrode for a lithium ion secondary battery of Example 18 was used.

Example 19

Lithium hydroxide (LiOH) (6 mol), iron (II) acetate (Fe(CH$_3$COO)$_2$) (0.53 mol), cobalt (II) acetate (Co(CH$_3$COO)$_2$) (0.01 mol), magnesium acetate (Mg(CH$_3$COO)$_2$) (0.06 mol), manganese (II) acetate (Mn(CH$_3$COO)$_2$) (1.4 mol), phosphoric acid (H$_3$PO$_4$) (2 mol), and lithium sulfate (Li$_2$SO$_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 120° C. for one hour, thereby generating a sediment.

Next, the obtained sediment was cleaned with water, thereby obtaining a cake-form electrode active material.

Next, lithium hydroxide (LiOH) (0.1 mol), iron (II) acetate (Fe(CH$_3$COO)$_2$) (0.1 mol), phosphoric acid (H$_3$PO$_4$) (0.1 mol), and lithium sulfate (Li$_2$SO$_4$) (1.92×10$^{-5}$ mol) were added to this cake-form electrode active material, the components were mixed together so that a total amount reached 2 L and then dried, LiFePO$_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (7.2 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 2.5% by volume of NO for one hour at 700° C., and a granulated body having an average secondary particle diameter of 20 μm was obtained and considered as an electrode material for a lithium ion secondary battery of Example 19.

An electrode for a lithium ion secondary battery of Example 19 was produced in the same manner as in Example 1 except for the fact that the electrode material for a lithium ion secondary battery of Example 19 was used.

A lithium ion secondary battery of Example 19 was produced in the same manner as in Example 1 except for the fact that the electrode for a lithium ion secondary battery of Example 19 was used.

Example 20

Lithium hydroxide (LiOH) (6 mol), iron (II) acetate (Fe(CH$_3$COO)$_2$) (0.53 mol), cobalt (II) acetate (Co(CH$_3$COO)$_2$) (0.01 mol), magnesium acetate (Mg(CH$_3$COO)$_2$) (0.06 mol), manganese (II) acetate (Mn(CH$_3$COO)$_2$) (1.4 mol), phosphoric acid (H$_3$PO$_4$) (2 mol), and lithium sulfate (Li$_2$SO$_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 120° C. for one hour, thereby generating a sediment.

Next, the obtained sediment was cleaned with water, thereby obtaining a cake-form electrode active material.

Next, lithium hydroxide (LiOH) (0.1 mol), iron (II) acetate (Fe(CH$_3$COO)$_2$) (0.1 mol), phosphoric acid (H$_3$PO$_4$) (0.1 mol), and lithium sulfate (Li$_2$SO$_4$) (1.92×10$^{-5}$ mol) were added to this cake-form electrode active material, the components were mixed together so that a total amount reached 2 L and then dried, LiFePO$_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (5.4 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 5.0% by volume of NO for one hour at 700° C., and a granulated body having an average secondary particle diameter of 20 μm was obtained and considered as an electrode material for a lithium ion secondary battery of Example 20.

An electrode for a lithium ion secondary battery of Example 20 was produced in the same manner as in Example 1 except for the fact that the electrode material for a lithium ion secondary battery of Example 20 was used.

A lithium ion secondary battery of Example 20 was produced in the same manner as in Example 1 except for the fact that the electrode for a lithium ion secondary battery of Example 20 was used.

Example 21

Lithium hydroxide (LiOH) (6 mol), iron (II) acetate $(Fe(CH_3COO)_2)$ (0.53 mol), cobalt (II) acetate (Co $(CH_3COO)_2$) (0.01 mol), magnesium acetate (Mg $(CH_3COO)_2$) (0.06 mol), manganese (II) acetate (Mn $(CH_3COO)_2$) (1.4 mol), phosphoric acid ($H_3PO_4$) (2 mol), and lithium sulfate ($Li_2SO_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 150° C. for one hour, thereby generating a sediment.

Next, the obtained sediment was cleaned with water, thereby obtaining a cake-form electrode active material.

Next, lithium hydroxide (LiOH) (0.1 mol), iron (II) acetate ($Fe(CH_3COO)_2$) (0.1 mol), phosphoric acid ($H_3PO_4$) (0.1 mol), and lithium sulfate ($Li_2SO_4$) ($1.92 \times 10^{-5}$ mol) were added to this cake-form electrode active material, the components were mixed together so that a total amount reached 2 L and then dried, $LiFePO_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (13.2 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.1% by volume of $O_3$ for one hour at 800° C., and a granulated body having an average secondary particle diameter of 20 μm was obtained and considered as an electrode material for a lithium ion secondary battery of Example 21.

An electrode for a lithium ion secondary battery of Example 21 was produced in the same manner as in Example 1 except for the fact that the electrode material for a lithium ion secondary battery of Example 21 was used.

A lithium ion secondary battery of Example 21 was produced in the same manner as in Example 1 except for the fact that the electrode for a lithium ion secondary battery of Example 21 was used.

Example 22

Lithium hydroxide (LiOH) (6 mol), iron (II) acetate ($Fe(CH_3COO)_2$) (0.53 mol), cobalt (II) acetate (Co $(CH_3COO)_2$) (0.01 mol), magnesium acetate (Mg $(CH_3COO)_2$) (0.06 mol), manganese (II) acetate (Mn $(CH_3COO)_2$) (1.4 mol), phosphoric acid ($H_3PO_4$) (2 mol), and lithium sulfate ($Li_2SO_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 150° C. for one hour, thereby generating a sediment.

Next, the obtained sediment was cleaned with water, thereby obtaining a cake-form electrode active material.

Next, lithium hydroxide (LiOH) (0.1 mol), iron (II) acetate ($Fe(CH_3COO)_2$) (0.1 mol), phosphoric acid ($H_3PO_4$) (0.1 mol), and lithium sulfate ($Li_2SO_4$) ($1.92 \times 10^{-5}$ mol) were added to this cake-form electrode active material, the components were mixed together so that a total amount reached 2 L and then dried, $LiFePO_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (9.6 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.5% by volume of $O_3$ for one hour at 800° C., and a granulated body having an average secondary particle diameter of 20 μm was obtained and considered as an electrode material for a lithium ion secondary battery of Example 22.

An electrode for a lithium ion secondary battery of Example 22 was produced in the same manner as in Example 1 except for the fact that the electrode material for a lithium ion secondary battery of Example 22 was used.

A lithium ion secondary battery of Example 22 was produced in the same manner as in Example 1 except for the fact that the electrode for a lithium ion secondary battery of Example 22 was used.

Example 23

Lithium hydroxide (LiOH) (6 mol), iron (II) acetate ($Fe(CH_3COO)_2$) (0.53 mol), cobalt (II) acetate (Co $(CH_3COO)_2$) (0.01 mol), magnesium acetate (Mg $(CH_3COO)_2$) (0.06 mol), manganese (II) acetate (Mn $(CH_3COO)_2$) (1.4 mol), phosphoric acid ($H_3PO_4$) (2 mol), and lithium sulfate ($Li_2SO_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 180° C. for one hour, thereby generating a sediment.

Next, the obtained sediment was cleaned with water, thereby obtaining a cake-form electrode active material.

Next, lithium hydroxide (LiOH) (0.1 mol), iron (II) acetate (Fe(CH$_3$COO)$_2$) (0.1 mol), phosphoric acid (H$_3$PO$_4$) (0.1 mol), and lithium sulfate (Li$_2$SO$_4$) (1.92×10$^{-5}$ mol) were added to this cake-form electrode active material, the components were mixed together so that a total amount reached 2 L and then dried, LiFePO$_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (4.8 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 2.5% by volume of O$_3$ for one hour at 800° C., and a granulated body having an average secondary particle diameter of 20 µm was obtained and considered as an electrode material for a lithium ion secondary battery of Example 23.

An electrode for a lithium ion secondary battery of Example 23 was produced in the same manner as in Example 1 except for the fact that the electrode material for a lithium ion secondary battery of Example 23 was used.

A lithium ion secondary battery of Example 23 was produced in the same manner as in Example 1 except for the fact that the electrode for a lithium ion secondary battery of Example 23 was used.

Example 24

Lithium hydroxide (LiOH) (6 mol), iron (II) acetate (Fe(CH$_3$COO)$_2$) (0.53 mol), cobalt (II) acetate (Co(CH$_3$COO)$_2$) (0.01 mol), magnesium acetate (Mg(CH$_3$COO)$_2$) (0.06 mol), manganese (II) acetate (Mn(CH$_3$COO)$_2$) (1.4 mol), phosphoric acid (H$_3$PO$_4$) (2 mol), and lithium sulfate (Li$_2$SO$_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 200° C. for one hour, thereby generating a sediment.

Next, the obtained sediment was cleaned with water, thereby obtaining a cake-form electrode active material.

Next, lithium hydroxide (LiOH) (0.1 mol), iron (II) acetate (Fe(CH$_3$COO)$_2$) (0.1 mol), phosphoric acid (H$_3$PO$_4$) (0.1 mol), and lithium sulfate (Li$_2$SO$_4$) (1.92×10$^{-5}$ mol) were added to this cake-form electrode active material, the components were mixed together so that a total amount reached 2 L and then dried, LiFePO$_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (4.8 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 5.0% by volume of O$_3$ for one hour at 800° C., and a granulated body having an average secondary particle diameter of 20 µm was obtained and considered as an electrode material for a lithium ion secondary battery of Example 24.

An electrode for a lithium ion secondary battery of Example 24 was produced in the same manner as in Example 1 except for the fact that the electrode material for a lithium ion secondary battery of Example 24 was used.

A lithium ion secondary battery of Example 24 was produced in the same manner as in Example 1 except for the fact that the electrode for a lithium ion secondary battery of Example 24 was used.

Comparative Example 1

Lithium hydroxide (LiOH) (6 mol), iron (II) acetate (Fe(CH$_3$COO)$_2$) (2 mol), phosphoric acid (H$_3$PO$_4$) (2 mol), and lithium sulfate (Li$_2$SO$_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 120° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (24.0 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere for one hour at 700° C., and a granulated body having an average secondary particle diameter of 20 µm was obtained and considered as an electrode material for a lithium ion secondary battery of Comparative Example 1.

An electrode for a lithium ion secondary battery of Comparative Example 1 was produced in the same manner as in Example 1 except for the fact that the electrode material for a lithium ion secondary battery of Comparative Example 1 was used.

A lithium ion secondary battery of Comparative Example 1 was produced in the same manner as in Example 1 except for the fact that the electrode for a lithium ion secondary battery of Comparative Example 1 was used.

Comparative Example 2

Lithium hydroxide (LiOH) (6 mol), iron (II) acetate ($Fe(CH_3COO)_2$) (2 mol), phosphoric acid ($H_3PO_4$) (2 mol), and lithium sulfate ($Li_2SO_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 130° C. for one hour, thereby generating a sediment.

Next, the obtained sediment was cleaned with water, thereby obtaining a cake-form electrode active material.

Next, this cake-form electrode active material (150 g), a lactose aqueous solution obtained by dispersing and dissolving lactose (1.2 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 10.0% by volume of $HNO_3$ for one hour at 900° C., and a granulated body having an average secondary particle diameter of 10 μm was obtained and considered as an electrode material for a lithium ion secondary battery of Comparative Example 2.

An electrode for a lithium ion secondary battery of Comparative Example 2 was produced in the same manner as in Example 1 except for the fact that the electrode material for a lithium ion secondary battery of Comparative Example 2 was used.

A lithium ion secondary battery of Comparative Example 2 was produced in the same manner as in Example 1 except for the fact that the electrode for a lithium ion secondary battery of Comparative Example 2 was used.

Comparative Example 3

Lithium hydroxide (LiOH) (6 mol), iron (II) acetate ($Fe(CH_3COO)_2$) (2 mol), phosphoric acid ($H_3PO_4$) (2 mol), and lithium sulfate ($Li_2SO_4$) (0.100 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 200° C. for one hour, thereby generating a sediment.

Next, the obtained sediment was cleaned with water, thereby obtaining a cake-form electrode active material. Next, this cake-form electrode active material (150 g), a lactose aqueous solution obtained by dispersing and dissolving lactose (0.6 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 0.5% by volume of $HNO_3$ for one hour at 800° C., and a granulated body having an average secondary particle diameter of 70 μm was obtained and considered as an electrode material for a lithium ion secondary battery of Comparative Example 3.

An electrode for a lithium ion secondary battery of Comparative Example 3 was produced in the same manner as in Example 1 except for the fact that the electrode material for a lithium ion secondary battery of Comparative Example 3 was used.

A lithium ion secondary battery of Comparative Example 3 was produced in the same manner as in Example 1 except for the fact that the electrode for a lithium ion secondary battery of Comparative Example 3 was used.

Comparative Example 4

Lithium hydroxide (LiOH) (6 mol), iron (II) acetate ($Fe(CH_3COO)_2$) (0.53 mol), cobalt (II) acetate ($Co(CH_3COO)_2$) (0.01 mol), magnesium acetate ($Mg(CH_3COO)_2$) (0.06 mol), manganese (II) acetate ($Mn(CH_3COO)_2$) (1.4 mol), phosphoric acid ($H_3PO_4$) (2 mol), and lithium sulfate ($Li_2SO_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 120° C. for one hour, thereby generating a sediment.

Next, the obtained sediment was cleaned with water, thereby obtaining a cake-form electrode active material.

Next, lithium hydroxide (LiOH) (0.1 mol), iron (II) acetate ($Fe(CH_3COO)_2$) (0.1 mol), phosphoric acid ($H_3PO_4$) (0.1 mol), and lithium sulfate ($Li_2SO_4$) ($1.92 \times 10^{-5}$ mol) were added to this cake-form electrode active material, the components were mixed together so that a total amount reached 2 L and then dried, $LiFePO_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (22.8 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere for one hour at 700° C., and a granulated body having an average secondary particle diameter of 5 μm was obtained and considered as an electrode material for a lithium ion secondary battery of Comparative Example 4.

An electrode for a lithium ion secondary battery of Comparative Example 4 was produced in the same manner as in Example 1 except for the fact that the electrode material for a lithium ion secondary battery of Comparative Example 4 was used.

A lithium ion secondary battery of Comparative Example 4 was produced in the same manner as in Example 1 except for the fact that the electrode for a lithium ion secondary battery of Comparative Example 4 was used.

Comparative Example 5

Lithium hydroxide (LiOH) (6 mol), iron (II) acetate (Fe($CH_3COO)_2$) (0.53 mol), cobalt (II) acetate (Co($CH_3COO)_2$) (0.01 mol), magnesium acetate (Mg($CH_3COO)_2$) (0.06 mol), manganese (II) acetate (Mn($CH_3COO)_2$) (1.4 mol), phosphoric acid ($H_3PO_4$) (2 mol), and lithium sulfate ($Li_2SO_4$) (0.123 mol) were added to water (2 L) and mixed together so that a total amount reached 4 L, thereby preparing a homogeneous slurry-form mixture.

Next, this mixture was stored in a pressure-resistant airtight container having a capacity of 8 L and was hydrothermally synthesized at 110° C. for one hour, thereby generating a sediment.

Next, the obtained sediment was cleaned with water, thereby obtaining a cake-form electrode active material.

Next, lithium hydroxide (LiOH) (0.1 mol), iron (II) acetate (Fe($CH_3COO)_2$) (0.1 mol), phosphoric acid ($H_3PO_4$) (0.1 mol), and lithium sulfate ($Li_2SO_4$) ($1.92 \times 10^{-5}$ mol) were added to this cake-form electrode active material, the components were mixed together so that a total amount reached 2 L and then dried, $LiFePO_4$ having an average primary particle diameter of 5 nm (40.1 mol) was uniformly supported by a surface of the electrode active material, thereby obtaining an electrode active material.

Next, to the electrode active material (150 g), a lactose aqueous solution obtained by dispersing and dissolving lactose (4.2 g) as a carbon precursor in water (200 g), and zirconia balls (500 g) having a diameter of 0.1 mm as medium particles were injected into a ball mill, a rotation rate and a stirring time of the ball mill were adjusted so that a ratio (D90/D10) of D90 to D10 of a particle size distribution of an electrode active material in the slurry reached 30, and a dispersion treatment was carried out. Therefore, a slurry including the electrode active material was obtained.

Next, the obtained slurry was sprayed and dried in the atmosphere at 200° C., thereby obtaining a dried substance.

Next, the obtained dried substance was calcinated in a nitrogen atmosphere including 10.0% by volume of $HNO_3$ for one hour at 900° C., and a granulated body having an average secondary particle diameter of 10 μm was obtained and considered as an electrode material for a lithium ion secondary battery of Comparative Example 5.

An electrode for a lithium ion secondary battery of Comparative Example 5 was produced in the same manner as in Example 1 except for the fact that the electrode material for a lithium ion secondary battery of Comparative Example 5 was used.

A lithium ion secondary battery of Comparative Example 5 was produced in the same manner as in Example 1 except for the fact that the electrode for a lithium ion secondary battery of Comparative Example 5 was used.

[Evaluation of Electrode Materials for Lithium Ion Secondary Battery]

The electrode materials for a lithium ion secondary battery of Example 1 to Example 24 and Comparative Example to Comparative Example 5 were evaluated using the following methods. The results are shown in Table 1.

(1) Green Compact Density Under Application of 51 MPa

A predetermined amount of the electrode material was loaded into a cylindrical mold of a powder resistance measurement system (trade name: MCP-PD51 type, manufactured by Mitsubishi Chemical Analytech Co., Ltd.) at room temperature (25° C.) to produce a pellet, next, a pellet thickness was measured when a pressure of 51 MPa was applied using a push stick, and a pellet density under application of 51 MPa, that is, a green compact density was obtained from a mass of the electrode material and a volume of the pellet.

(2) Amount of Carbon in Electrode Active Material

A content of carbon in the electrode material granulated body obtained in the above-described thermal treatment step was measured using a carbon-sulfur analyzer (trade name: EMIA-320V, manufactured by Horiba Ltd.).

(3) Average Film Thickness of Carbonaceous Film

An average film thickness of the carbonaceous film was measured from an average value of the thicknesses of the carbonaceous film of 100 different particles in an agglomerate by observing the carbonaceous film of the agglomerate using a transmission electron microscope (TEM).

(4) Average Primary Particle Diameter of Carbon Coated Electrode Active Material The carbon coated electrode active material was observed using a scanning electron microscopic (SEM), long-axis diameters of 100 particles of the electrode active material that were randomly selected from the obtained SEM image, and an average primary particle diameter of the carbon coated electrode active material was calculated from these measurement values.

(5) Crystallite Diameter of Electrode Active Material

The crystallite diameter of the electrode active material was calculated from the Scherrer equation using a full width at half maximum of a diffraction peak of a (020) plane in a powder X-ray diffraction pattern that was measured by means of X-ray diffraction measurement (X-ray diffractormeter: X'Pert (trade name), manufactured by Analytical) and a diffraction angle (2θ).

(6) Average Secondary Particle Diameter of Electrode Material Granulated Body

The electrode material granulated body was dispersed in water containing 0.3% by mass of polyvinyl pyrrolidone, and then an average secondary particle diameter of the electrode material granulated body was measured using a particle size distribution measurement instrument (trade name: SALD-2000J, manufactured by Shimadzu Corporation).

(7) Functionalization Ratio

The electrode material was analyzed using a time-of-flight secondary ion mass spectrometer manufactured by Ulvac-PHI, Inc. (trade name: PHI nano TOF) under conditions of a primary ion of $Bi^{3++}$, an accelerated voltage of 30 kV, an ion current of approximately 0.1 nA, an analysis area of 100 μm, and an analysis time of 30 minutes. On the basis of the result, a ratio (functionalization ratio) of a total of the count numbers of at least one selected from a carboxyl group, a nitro group, and a sulfo group to the count number of the hydroxy group on the outermost surface of the carbonaceous film that coated the electrode active material which faces the electrode active material was calculated.

(8) Coating Ratio of Carbonaceous Film

The electrode material was analyzed using a time-of-flight secondary ion mass spectrometer manufactured by Ulvac-PHI, Inc. (trade name: PHI nano TOF) under conditions of a primary ion of $Bi^{3++}$, an accelerated voltage of 30 kV, an ion current of approximately 0.1 nA, an analysis area of 100 μm, and an analysis time of 30 minutes. On the basis of the result, a coating ratio of the carbonaceous film was calculated. In this analysis, as a result of analyzing the surfaces of primary particles made of the electrode active material and the carbonaceous film, an area in which a meaningful amount of lithium ions were detected in the entire measurement area was considered as an exposure proportion of the electrode active material, an area in which a meaningful amount of lithium ions were not detected was considered as a proportion of the carbonaceous film, and the coating ratio of carbon was calculated.

(9) Number of Through-Holes in Carbonaceous Film

The electrode material was analyzed using a time-of-flight secondary ion mass spectrometer manufactured by Ulvac-PHI, Inc. (trade name: PHI nano TOF) under conditions of a primary ion of $Bi^{3++}$, an accelerated voltage of 30 kV, an ion current of approximately 0.1 nA, an analysis area of 100 μm, and an analysis time of 30 minutes. On the basis of the result, the number of through-holes formed in the carbonaceous film was calculated. In this analysis, as a result of analyzing the surface of the primary particles made of the electrode active material and the carbonaceous film, in a region in which a meaningful amount of lithium ions were detected in the entire measurement area, the electrode active material was considered to be exposed, and a region in which a meaningful amount of lithium ions were detected in the carbonaceous film was considered as a through-hole.

(10) Ratio of Diameter of Opening Portion Present on Surface of Carbonaceous Film in Through-Hole to Average Film Thickness of Carbonaceous Film A diameter of an opening portion present on the surface of the carbonaceous film in the through-hole formed in the carbonaceous film was measured as a spot diameter of a detection place of lithium ions based on a result of a surface analysis using a time-of-flight secondary ion mass spectrometer.

The diameter of the opening portion with respect to the average film thickness of the carbonaceous film obtained in (3) was calculated.

[Evaluation of Lithium Ion Secondary Batteries]

The lithium ion secondary batteries obtained in Example 1 to Example 24 and Comparative Example 1 to Comparative Example 5 were evaluated using the following methods. The results are shown in Table 1.

(11) Charge and Discharge Rate Performance (Input and Output Characteristics)

Regarding a charging and discharging test of the lithium ion secondary battery, constant-current charging and discharging (one-hour charging and then one-hour discharging) at a cutoff voltage of 2 V to 4.5 V and a charge and discharge rate of 1 C was considered as one cycle, this operation was carried out three cycles, then, 0.1 C charging was carried out, and then 0.1 C discharging and 5 C discharging were carried out respectively at individual temperatures of 25° C. and 0° C., thereby obtaining a 0.1 C discharge capacity and a 5 C discharge capacity. A value of the 5 C discharge capacity expressed as a percentage when the 0.1 C discharge capacity was set to 100 was specified as "charge and discharge rate performance".

(12) Capacity Retention (45° C., after 500 Cycles) (Cycle Characteristics)

Regarding a charging and discharging test of the lithium ion secondary battery, constant-current charging and discharging (one-hour charging and then one-hour discharging) at a cutoff voltage of 2 V to 4.5 V and a charge and discharge rate of 1 C was considered as one cycle, and this operation was carried out 500 cycles at 45° C. In addition, a value of a discharge amount after 500 cycles expressed as a percentage when an initial discharge amount was set to 100 was specified as a "capacity retention after 500 cycles at 45° C.".

Meanwhile, initial charging of the lithium ion secondary battery was carried out at a constant current (1 C) and a constant voltage (4.5 V, the charging was finished when a voltage equivalent to a current value of 0.01 C was reached), and a 1 C discharge amount at a second constant-current charging and discharging (cutoff voltage of 2 V to 4.5 V, charge and discharge rate of 1 C) from which an amount consumed by lithium ions for the formation of a solid electrolyte interface (SEI) of an anode during the initial charging was subtracted was specified as the initial discharge amount.

TABLE 1

| | Electrode active material composition of compound A | Electrode active material composition of compound B | Amount of carbon in electrode active material (% by mass) | Average film thickness of carbonaceous film (nm) | Average primary particle diameter of electrode active material obtained by forming carbon film (μm) | Crystallite diameter of electrode active material (μm) | Average secondary particle diameter of electrode active material obtained by forming carbon film (μm) |
|---|---|---|---|---|---|---|---|
| Example 1 | LiFePO$_4$ | — | 2.5 | 4 | 0.08 | 0.05 | 10 |
| Example 2 | LiFePO$_4$ | — | 2.2 | 4 | 0.09 | 0.05 | 10 |
| Example 3 | LiFePO$_4$ | — | 1.9 | 3 | 0.09 | 0.05 | 10 |
| Example 4 | LiFePO$_4$ | — | 1.5 | 3 | 0.10 | 0.06 | 10 |
| Example 5 | LiFePO$_4$ | — | 2.1 | 6 | 0.15 | 0.09 | 10 |
| Example 6 | LiFePO$_4$ | — | 0.8 | 7 | 5 | 5 | 25 |
| Example 7 | LiFePO$_4$ | — | 0.8 | 7 | 7 | 7 | 35 |
| Example 8 | LiFePO$_4$ | — | 0.8 | 2 | 0.1 | 0.06 | 0.3 |
| Example 9 | LiFePO$_4$ | — | 1.8 | 9 | 0.24 | 0.14 | 14 |
| Example 10 | LiFePO$_4$ | — | 1.6 | 8 | 0.26 | 0.15 | 14 |
| Example 11 | LiFePO$_4$ | — | 1.4 | 8 | 0.28 | 0.16 | 14 |
| Example 12 | LiFePO$_4$ | — | 1.2 | 7 | 0.30 | 0.17 | 14 |
| Example 13 | LiFe$_{0.265}$Co$_{0.005}$Mg$_{0.03}$Mn$_{0.7}$PO$_4$ | LiFePO$_4$ | 1.9 | 2 | 0.05 | 0.03 | 20 |
| Example 14 | LiFe$_{0.265}$Co$_{0.005}$Mg$_{0.03}$Mn$_{0.7}$PO$_4$ | LiFePO$_4$ | 1.6 | 2 | 0.06 | 0.03 | 20 |
| Example 15 | LiFe$_{0.265}$Co$_{0.005}$Mg$_{0.03}$Mn$_{0.7}$PO$_4$ | LiFePO$_4$ | 1.3 | 2 | 0.07 | 0.04 | 20 |

TABLE 1-continued

| | | | | | | | |
|---|---|---|---|---|---|---|---|
| Example 16 | LiFe$_{0.265}$Co$_{0.005}$Mg$_{0.03}$Mn$_{0.7}$PO$_4$ | LiFePO$_4$ | 1.0 | 2 | 0.08 | 0.05 | 20 |
| Example 17 | LiFe$_{0.265}$Co$_{0.005}$Mg$_{0.03}$Mn$_{0.7}$PO$_4$ | LiFePO$_4$ | 2.5 | 5 | 0.09 | 0.05 | 20 |
| Example 18 | LiFe$_{0.265}$Co$_{0.005}$Mg$_{0.03}$Mn$_{0.7}$PO$_4$ | LiFePO$_4$ | 1.6 | 3 | 0.10 | 0.06 | 20 |
| Example 19 | LiFe$_{0.265}$Co$_{0.005}$Mg$_{0.03}$Mn$_{0.7}$PO$_4$ | LiFePO$_4$ | 1.2 | 3 | 0.14 | 0.08 | 20 |
| Example 20 | LiFe$_{0.265}$Co$_{0.005}$Mg$_{0.03}$Mn$_{0.7}$PO$_4$ | LiFePO$_4$ | 0.9 | 3 | 0.16 | 0.09 | 20 |
| Example 21 | LiFe$_{0.265}$Co$_{0.005}$Mg$_{0.03}$Mn$_{0.7}$PO$_4$ | LiFePO$_4$ | 2.2 | 7 | 0.17 | 0.10 | 20 |
| Example 22 | LiFe$_{0.265}$Co$_{0.005}$Mg$_{0.03}$Mn$_{0.7}$PO$_4$ | LiFePO$_4$ | 1.6 | 6 | 0.18 | 0.10 | 20 |
| Example 23 | LiFe$_{0.265}$Co$_{0.005}$Mg$_{0.03}$Mn$_{0.7}$PO$_4$ | LiFePO$_4$ | 0.8 | 7 | 2.00 | 0.20 | 20 |
| Example 24 | LiFe$_{0.265}$Co$_{0.005}$Mg$_{0.03}$Mn$_{0.7}$PO$_4$ | LiFePO$_4$ | 0.8 | 7 | 2.50 | 0.50 | 20 |
| Comparative Example 1 | LiFePO$_4$ | — | 4.0 | 8 | 0.10 | 0.06 | 20 |
| Comparative Example 2 | LiFePO$_4$ | — | 0.2 | 0.8 | 0.20 | 0.11 | 10 |
| Comparative Example 3 | LiFePO$_4$ | — | 0.1 | 22.0 | 11.00 | 11.00 | 70 |
| Comparative Example 4 | LiFe$_{0.265}$Co$_{0.005}$Mg$_{0.03}$Mn$_{0.7}$PO$_4$ | LiFePO$_4$ | 3.8 | 8 | 0.10 | 0.06 | 5 |
| Comparative Example 5 | LiFe$_{0.265}$Co$_{0.005}$Mg$_{0.03}$Mn$_{0.7}$PO$_4$ | LiFePO$_4$ | 0.7 | 0.6 | 0.04 | 0.02 | 10 |

| | Functionalization ratio (%) | Carbon coating ratio (%) | Number of through-holes per 100 square meters of carbonaceous film (through-holes) | Opening portion diameter of through-hole (nm)/film thickness of carbonaceous film (nm) | Charge and discharge rate performance at 25° C. 5 C discharge capacity/0.1 C discharge capacity (%) | Charge and discharge rate performance at 0° C. 5 C discharge capacity/0.1 C discharge capacity (%) | Capacity retention after 500 cycles at 45° C. (%) |
|---|---|---|---|---|---|---|---|
| Example 1 | 0.002 | 57 | 1 | 0.5 | 87 | 82 | 88 |
| Example 2 | 0.034 | 56 | 3 | 0.8 | 88 | 83 | 87 |
| Example 3 | 0.118 | 49 | 5 | 0.9 | 90 | 84 | 89 |
| Example 4 | 0.257 | 43 | 15 | 1.5 | 91 | 85 | 89 |
| Example 5 | 0.049 | 90 | 9 | 1.0 | 93 | 84 | 89 |
| Example 6 | 0.672 | 90 | 12 | 2.4 | 80 | 61 | 92 |
| Example 7 | 2.365 | 90 | 18 | 3.8 | 73 | 53 | 90 |
| Example 8 | 5.142 | 23 | 25 | 4.9 | 70 | 42 | 89 |
| Example 9 | 0.083 | 86 | 58 | 6.8 | 92 | 83 | 87 |
| Example 10 | 1.142 | 83 | 67 | 7.2 | 92 | 83 | 87 |
| Example 11 | 4.021 | 78 | 84 | 7.8 | 93 | 84 | 87 |
| Example 12 | 8.741 | 72 | 98 | 9.6 | 93 | 84 | 87 |
| Example 13 | 0.001 | 54 | 2 | 0.6 | 80 | 40 | 85 |
| Example 14 | 0.028 | 55 | 4 | 0.9 | 80 | 40 | 85 |
| Example 15 | 0.987 | 52 | 7 | 1.2 | 81 | 41 | 85 |
| Example 16 | 0.364 | 46 | 13 | 1.6 | 81 | 41 | 85 |
| Example 17 | 0.049 | 64 | 8 | 1.1 | 82 | 42 | 85 |
| Example 18 | 0.672 | 46 | 15 | 2.5 | 82 | 42 | 85 |
| Example 19 | 2.311 | 49 | 19 | 3.7 | 80 | 40 | 85 |
| Example 20 | 6.854 | 40 | 28 | 5.4 | 80 | 40 | 85 |
| Example 21 | 0.061 | 90 | 100 | 6.2 | 81 | 41 | 85 |
| Example 22 | 1.142 | 82 | 300 | 7.3 | 81 | 41 | 85 |
| Example 23 | 3.929 | 80 | 600 | 8.2 | 82 | 42 | 85 |
| Example 24 | 9.583 | 90 | 1000 | 9.1 | 82 | 42 | 85 |
| Comparative Example 1 | 0.0005 | 93 | 0.1 | 0.2 | 69 | 39 | 80 |
| Comparative Example 2 | 15 | 35 | 12000 | 30.0 | 62 | 31 | 84 |
| Comparative Example 3 | 12 | 38 | 500 | 0.4 | 30 | 20 | 84 |
| Comparative Example 4 | 0.0001 | 95 | 0.5 | 0.3 | 67 | 31 | 79 |
| Comparative Example 5 | 18 | 30 | 9000 | 13.0 | 59 | 22 | 78 |

From the results in Table 1, the green compact densities under the application of 51 MPa of the electrode materials for a lithium ion secondary battery of Example 1 to Example 24 were all 2.3 g/cm$^3$ or less.

On the other hand, the green compact densities under the application of 51 MPa of the electrode materials for a lithium ion secondary battery of Comparative Example 1 to Comparative Example 5 were 1.8 g/cm$^3$ to 2.1 g/cm$^3$.

That is, when the electrode materials for a lithium ion secondary battery of Example 1 to Example 24 were compared with the electrode materials for a lithium ion secondary battery of Comparative Example 1 to Comparative Example 5, it was found that the electrode mixture layer was formed, and, in the pressurization of the electrode mixture layer, the number of contact points of the conductive auxiliary agent in the electrode mixture layer became sufficient without causing the collapse of pores present in the electrode material granulated body.

In addition, when the lithium ion secondary batteries of Example 1 to Example 24 were compared with the lithium ion secondary batteries of Comparative Example 1 to Comparative Example 5, it was found that the charge and discharge rate performance was excellent, the capacity retention after 500 cycles was high, and the durability was excellent.

The electrode material for a lithium ion secondary battery of the present invention is an electrode material for a lithium ion secondary battery including an electrode active material and a carbonaceous film that coats a surface of the electrode active material, in which a hydroxy group and at least one selected from a carboxyl group, a nitro group, and a sulfo group are introduced to an outermost surface of the carbonaceous film that faces the electrode active material, in a case in which a surface of the carbonaceous film is analyzed through time-of-flight secondary ion mass spectrometry, a ratio of a total of count numbers of at least one selected from the carboxyl group, the nitro group, and the sulfo group to a count number of the hydroxy group is 0.001 or more and 10.000 or less, a coating ratio of the carbonaceous film is set to 40% or more and 90% or less, and the carbonaceous film has at least one through-hole per 100 square nanometers of the carbonaceous film, and thus it is possible to provide an electrode material for a lithium ion secondary battery which has a high electron conductivity and an excellent diffusivity of lithium ions and enables improvement of a battery service life. Therefore, a lithium ion secondary battery including an electrode for a lithium ion secondary battery produced using the electrode material for a lithium ion secondary battery is capable of high-speed charge and discharge, and thus can also be applied to next-generation secondary batteries from which a high voltage, a higher energy density, higher load characteristics, and higher-rate charge and discharge characteristics are anticipated, and, in the case of a next-generation secondary battery, an effect thereof is extremely significant.

By the present invention, an electrode material for a lithium ion secondary battery which has a high electron conductivity and an excellent diffusivity of lithium ions and enables improvement of a battery service life can be provided.

The invention claimed is:

1. An electrode material for a lithium ion secondary battery comprising:
   an electrode active material; and
   a carbonaceous film that coats a surface of the electrode active material,
   wherein a hydroxy group, a carboxyl group, a nitro group and a sulfo group have been introduced to an outermost surface of the carbonaceous film,
   a ratio of a total count number of the carboxyl group, the nitro group and the sulfo group, to a count number of the hydroxy group is 0.001 or more and 10.000 or less, when the outermost surface of the carbonaceous film is analyzed through time-of-flight secondary ion mass spectrometry to obtain the ratio,
   a coating ratio of the carbonaceous film is 40% or more and 90% or less,
   the carbonaceous film has at least one through-hole per 100 square nanometers of the carbonaceous film
   an average film thickness of the carbonaceous film is 1.0 nm or more and 7.0 nm or less, and
   a specific surface area of the electrode material is 5 m$^2$/g or more and 40 m$^2$/g or less.

2. The electrode material for a lithium ion secondary battery according to claim 1,
   wherein a ratio of a diameter of an opening of the through-hole, which is formed on the surface of the carbonaceous film, to an average film thickness of the carbonaceous film is 0.5 or more and 10.0 or less.

3. The electrode material for a lithium ion secondary battery according to claim 1,
   wherein the electrode active material is a compound represented by General Formula Li$_a$A$_b$D$_c$PO$_4$ (here, A represents at least one selected from the group consisting of Fe, Mn, Co, and Ni, D represents at least one selected from the group consisting of Mg, Ca, Sr, Ba, Ti, Zn, B, Al, Ga, In, Si, Ge, Sc, Y, and a rare earth element, 0≤a≤1.0, 0<b≤1.0, and 0≤c≤0.4).

4. An electrode material for a lithium ion secondary battery comprising:
   an electrode active material; and
   a carbonaceous film that coats a surface of the electrode active material,
   wherein a hydroxy group and a group which is at least one selected from a carboxyl group, a nitro group and a sulfo group have been introduced to an outermost surface of the carbonaceous film,
   a ratio of a total count number of the group which is at least one selected from the carboxyl group, the nitro group and the sulfo group, to a count number of the hydroxy group is 0.001 or more and 10.000 or less, when the outermost surface of the carbonaceous film is analyzed through time-of-flight secondary ion mass spectrometry to obtain the ratio,
   a coating ratio of the carbonaceous film is 40% or more and 90% or less, and
   the carbonaceous film has at least one through-hole per 100 square nanometers of the carbonaceous film,
   wherein the electrode active material contains the compound represented by General Formula Li$_a$A$_b$D$_c$PO$_4$ (here, A represents at least one selected from the group consisting of Fe, Mn, Co, and Ni, D represents at least one selected from the group consisting of Mg, Ca, Sr, Ba, Ti, Zn, B, Al, Ga, In, Si, Ge, Sc, Y, and a rare earth element, 0≤a≤1.0, 0<b≤1.0, and 0≤c≤0.4) and a compound represented by General Formula Li$_e$C$_f$PO$_4$ (here, C represents at least one selected from Fe and Mn, 0≤e<2, 0<f<1.5, and which is different from the compound represented by General Formula Li$_a$A$_b$D$_c$PO$_4$) which is located on a surface of the compound represented by General Formula Li$_a$A$_b$D$_c$PO$_4$.

5. An electrode material granulated body for a lithium ion secondary battery, which is formed by agglomerating and granulating a plurality of the electrode materials for a lithium ion secondary battery according to claim 1.

6. An electrode for a lithium ion secondary battery comprising:
   an electrode current collector; and
   an electrode mixture layer formed on the electrode current collector,
   wherein the electrode mixture layer contains the electrode material granulated body for a lithium ion secondary battery according to claim 5.

7. A lithium ion secondary battery comprising:
   a cathode;
   an anode; and
   a non-aqueous electrolyte,
   wherein the cathode is the electrode for a lithium ion secondary battery according to claim 6.

8. The electrode material for a lithium ion secondary battery according to claim 1,
   wherein the outermost surface faces the electrode active material.

9. The electrode material for a lithium ion secondary battery according to claim 4,
wherein a ratio of a diameter of an opening of the through-hole, which is formed on the surface of the carbonaceous film, to an average film thickness of the carbonaceous film is 0.5 or more and 10.0 or less.

10. The electrode material for a lithium ion secondary battery according to claim 4,
wherein an average film thickness of the carbonaceous film is 1.0 nm or more and 7.0 nm or less.

11. The electrode material for a lithium ion secondary battery according to claim 1,
wherein the electrode active material is a cathode active material.

* * * * *